(12) United States Patent
Mysore et al.

(10) Patent No.: US 12,314,735 B2
(45) Date of Patent: May 27, 2025

(54) DATA PROCESSING ARRAY EVENT TRACE AND PROFILING USING PROCESSOR SYSTEM EXECUTED KERNELS

(71) Applicant: Xilinx, Inc., San Jose, CA (US)

(72) Inventors: Nishant Mysore, Sunnyvale, CA (US); Anurag Dubey, Boulder, CO (US); Paul Robert Schumacher, Berthoud, CO (US); Jason Richard Villarreal, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 57 days.

(21) Appl. No.: 18/316,609

(22) Filed: May 12, 2023

(65) Prior Publication Data

US 2024/0378062 A1  Nov. 14, 2024

(51) Int. Cl.
*G06F 1/24* (2006.01)
*G06F 9/445* (2018.01)
*G06F 11/34* (2006.01)
*G06F 9/4401* (2018.01)

(52) U.S. Cl.
CPC ...... *G06F 9/44505* (2013.01); *G06F 11/3471* (2013.01); *G06F 9/4411* (2013.01)

(58) Field of Classification Search
CPC .......................... G06F 9/44505; G06F 11/3471
USPC ........................................................ 713/100
See application file for complete search history.

(56) References Cited

U.S. PATENT DOCUMENTS

| | | | |
|---|---|---|---|
| 7,490,227 B1 | 2/2009 | Bilski et al. | |
| 8,042,007 B1 | 10/2011 | Chan et al. | |
| 8,117,577 B1 | 2/2012 | Vadi et al. | |
| 8,415,974 B1* | 4/2013 | Lysaght | H03K 19/17756 |
| | | | 326/39 |
| 9,678,852 B2 | 6/2017 | Horley | |
| 10,346,572 B1 | 7/2019 | Corbett et al. | |
| 10,474,610 B1* | 11/2019 | Schelle | G06F 11/3636 |
| 2008/0244327 A1 | 10/2008 | Coombes | |
| 2008/0320268 A1* | 12/2008 | Wingard | G06F 15/17375 |
| | | | 711/E12.083 |
| 2010/0095152 A1* | 4/2010 | Darrington | G06F 11/1438 |
| | | | 714/19 |
| 2018/0150299 A1* | 5/2018 | Balle | G06F 11/3006 |
| 2019/0102224 A1* | 4/2019 | Bernat | G06F 9/485 |
| 2019/0303311 A1* | 10/2019 | Bilski | G06F 13/1657 |
| 2019/0317802 A1* | 10/2019 | Bachmutsky | G06F 9/5044 |
| 2022/0027278 A1* | 1/2022 | Wysocki | G06F 9/4881 |
| 2024/0354223 A1 | 10/2024 | Schumacher et al. | |
| 2024/0378358 A1 | 11/2024 | Schumacher et al. | |

\* cited by examiner

*Primary Examiner* — Volvick Derose

(74) *Attorney, Agent, or Firm* — Kevin T. Cuenot

(57) ABSTRACT

Within an integrated circuit including a processor system and a data processing array, one or more kernels in the processor system are executed in response to a scheduling request from a host data processing system. The one or more kernels receive configuration data for implementing trace or profiling of a user design executable by a plurality of active tiles of the data processing array. Using the one or more kernels, selected tiles of the plurality of active tiles of the data processing array are configured with the configuration data to perform the trace or the profiling. Trace data or profiling data is generated through execution of the user design by the data processing array. The one or more kernels provide the trace data or the profiling data to the host data processing system.

20 Claims, 19 Drawing Sheets

FIG. 12A

DATA PROCESSING ARRAY EVENT TRACE AND PROFILING USING PROCESSOR SYSTEM EXECUTED KERNELS

TECHNICAL FIELD

This disclosure relates to integrated circuits (ICs) and, more particularly, to systems and methods for performing event trace and profiling for a data processing array within an IC.

BACKGROUND

Modern integrated circuits (ICs) include a variety of different types of compute circuits. Examples of compute circuits that may be included in a single IC include, but are not limited to, one or more processors configured to execute program code, one or more dedicated and hardened circuit blocks configured to perform particular tasks, one or more user-specified circuits implemented in programmable circuitry (e.g., programmable logic), a data processing array, a graphics processing unit (GPU), or the like. In developing a design for an IC, it is often necessary to collect trace data from the compute circuits to ensure that the design is operating as intended and/or to debug the design.

In certain computing environments, the compute circuits are coupled to a host system as peripheral devices. The host system is capable of executing user program code (e.g., user applications) and, in doing so, offloading certain processing jobs/tasks to the compute circuits. This computing paradigm is often used in data centers, for example. In the usual case, the user applications executing on the host systems are considered a security concern. For this reason, the host system is prevented from directly accessing and/or configuring certain types of compute circuits. This affords the compute circuits a greater degree of protection from attack and malware. This also means that certain functionality of the compute circuits is unavailable to the host system directly. To implement and control event trace and profiling functionality in these compute circuits, alternative mechanisms for communicating with the compute circuits are needed.

SUMMARY

In one or more example implementations, a method includes, within an integrated circuit having a processor system and a data processing array, executing one or more kernels in the processor system in response to a scheduling request from a host data processing system. The method includes receiving, by the one or more kernels as executed by the processor system, configuration data for implementing trace or profiling of a user design that is executable (e.g., or executed) by a plurality of active tiles of the data processing array. The method includes configuring, using the one or more kernels, selected tiles of the plurality of active tiles of the data processing array with the configuration data to perform the trace or the profiling. The method includes generating trace data or profiling data through execution of the user design by the data processing array. The method includes providing, from the one or more kernels, the trace data or the profiling data to the host data processing system.

The foregoing and other implementations can each optionally include one or more of the following features, alone or in combination. Some example implementations include all the following features in combination.

In some aspects, the method includes the one or more kernels receiving, from the host data processing system, a buffer storing the configuration data.

In some aspects, the method includes, during execution of the user design by the data processing array, conveying the trace data from the data processing array to a local memory using an offload circuit architecture.

In some aspects, the trace data is stored in one or more buffers allocated by the one or more kernels in the local memory based on one or more addresses provided by the host data processing system.

In some aspects, the offload circuit architecture is implemented using programmable logic.

In some aspects, the offload circuit architecture is implemented using one or more direct memory access circuits.

In some aspects, the method includes receiving, by the processor system executing the one or more kernels, offload circuit architecture configuration data. The method includes configuring, by the processor system executing the one or more kernels, the offload circuit architecture for conveying a selected number of streams of trace data to the local memory.

In some aspects, the offload circuit architecture configuration data further specifies at least one of the one or more direct memory access circuits, a number of ports of the one or more direct memory access circuits to be used, a burst length for the trace data, a buffer size for storing the trace data, or physical addresses of buffers for storing the trace data.

In some aspects, the method includes sampling a plurality of counter values from the selected tiles of the data processing array during execution of the user design by the plurality of active tiles. The method includes providing the plurality of counter values as sampled to the host data processing system.

In some aspects, the configuring includes configuring performance counters in the selected tiles to count selected trace events.

In some aspects, the method includes executing a polling kernel in the processor system, in response to a further scheduling request from the host data processing system. The polling kernel performs the sampling and performs the providing the plurality of counter values as sampled to the host data processing system.

In some aspects, the polling kernel is operative responsive to a polling thread executing in the host data processing system that causes the polling kernel to perform the sampling at a specified interval during execution of the user design.

In one or more example implementations, a system includes an integrated circuit having a processor system and a data processing array. The processor system is configured to execute one or more kernels in response to a scheduling request from a host data processing system. The processor system, in executing the one or more kernels, is configured to perform operations. The operations include receiving configuration data for implementing at least one of a trace function or a profiling function for a user design that is executable by a plurality of active tiles of the data processing array. The operations include configuring the data processing array to implement at least one of trace or profiling while executing the user design based on the configuration data. The operations include outputting at least one of trace data or profiling data generated from execution of the user design by the data processing array.

The foregoing and other implementations can each optionally include one or more of the following features, alone or in combination. Some example implementations include all the following features in combination.

In some aspects, the integrated circuit includes an offload circuit architecture configured to convey the trace data from the data processing array to a local memory during execution of the user design by the data processing array.

In some aspects, the trace data is stored in one or more buffers allocated by the one or more kernels in the local memory based on one or more addresses provided by the host data processing system.

In some aspects, the offload circuit architecture is implemented using programmable logic.

In some aspects, the offload circuit architecture is implemented using one or more direct memory access circuits.

In some aspects, the one or more kernels, as executed by the processor system, are configured to receive offload circuit architecture configuration data from the host data processing system and configure the offload circuit architecture for conveying a selected number of streams of trace data to the local memory.

In some aspects, the processor system is configured to execute a polling kernel that generates the profiling data by sampling counter values from selected tiles of the plurality of active tiles of the data processing array during execution of the user design.

In some aspects, the polling is operative responsive to a polling thread executing in the host data processing system that causes the polling kernel to perform the sampling at a specified interval during execution of the user design.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIGS. 12A and 12B, taken collectively, illustrate an example report that may be generated by the data processing system.

DETAILED DESCRIPTION

Figure 1:
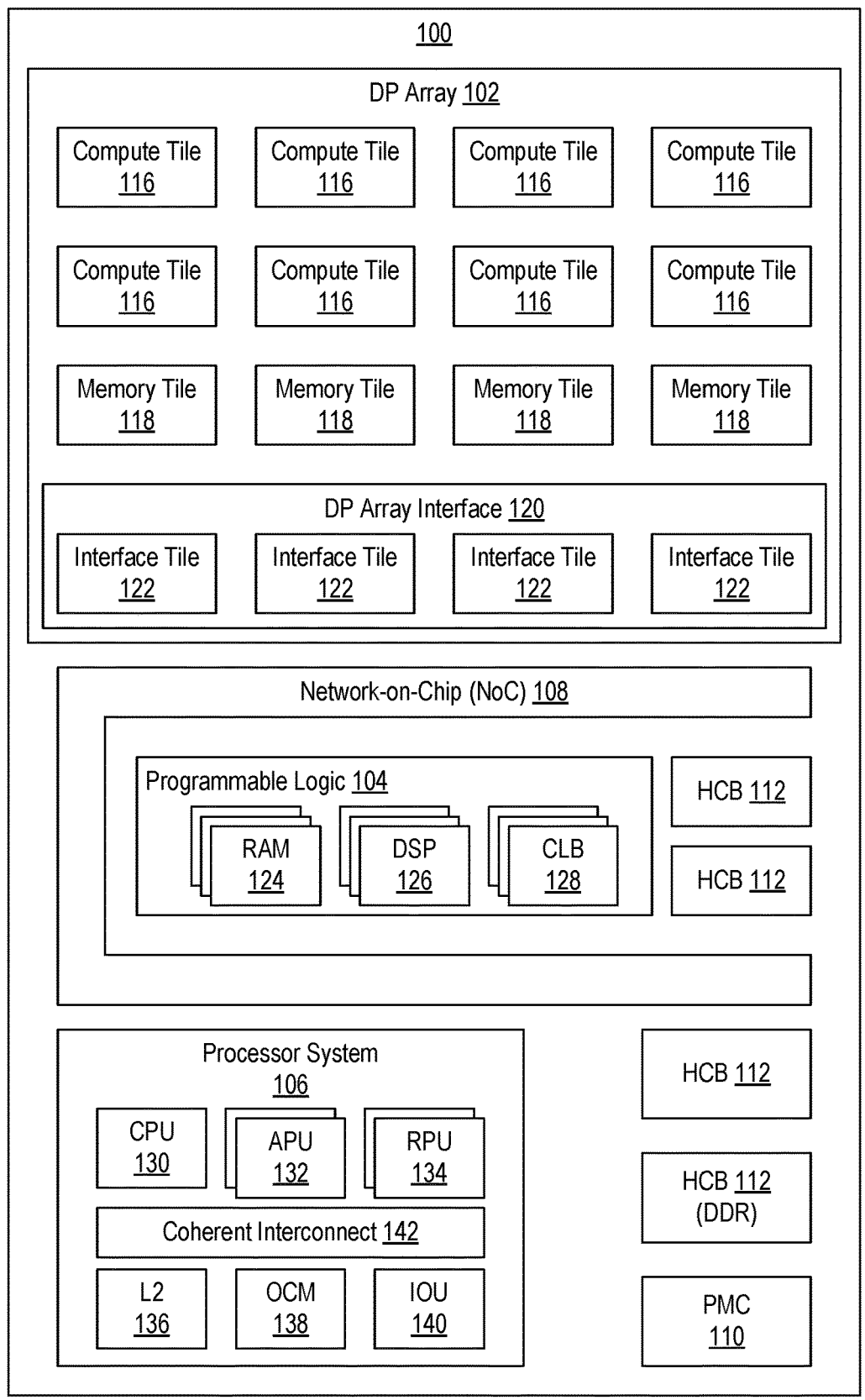
FIG. 1 illustrates an example architecture for an IC.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to performing trace and profiling for a data processing array (DP array) within an IC. In accordance with the inventive arrangements described within this disclosure, methods and systems are provided that allow a host data processing system to control trace functions and/or profiling functions for a user design implemented in a DP array of an IC. The host data processing system is capable of executing runtime program code (referred to herein as a "host runtime") that facilitates communication with the IC. Though the host data processing system is unable to directly access the DP array and/or configuration registers of the DP array, the methods and systems described herein provide mechanisms for the host data processing system to control trace functions and/or profiling functions for the user design as executed by the DP array at least indirectly.

In accordance with the inventive arrangements described within this disclosure, the IC that includes the DP array also includes a processor system. The processor system is capable of executing program code. Being disposed in the same IC as the DP array, the processor system is permitted to access the DP array and/or configuration registers thereof. The host runtime executed by the host data processing system is capable of scheduling one or more kernels to execute in the processor system of the IC. The kernels are executable functions or programs that execute in the processor system within the IC itself. Once executing, the kernel(s) are capable of communicating with the host data processing system and may communicate with the DP array in response to instructions received from the host data processing system. In response to the instructions from the host data processing system, the kernel(s) are capable of configuring the DP array for performing trace functions and/or profiling functions for the user design as executed by the DP array.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example architecture 100 for an IC. Architecture 100 may be used to implement a programmable IC, an adaptive system, and/or a System-on-Chip (SoC). In the example of FIG. 1, architecture 100 is implemented on a single die provided within a single package. In other examples, architecture 100 may be implemented using a plurality of interconnected dies within a single package where the various resources of architecture 100 (e.g., circuits) illustrated in FIG. 1 are implemented across the different interconnected dies.

In the example, architecture 100 includes a plurality of different subsystems including a DP array 102, programmable logic (PL) 104, a processor system (PS) 106, a Network-on-Chip (NoC) 108, a platform management controller (PMC) 110, and one or more hardwired circuit blocks (HCBs) 112.

DP array 102 is implemented as a plurality of interconnected and programmable tiles. The term "tile," as used herein, means a block or portion of circuitry also referred to as a "circuit block." As illustrated, DP array 102 includes a plurality of compute tiles 116 organized in an array and optionally a plurality of memory tiles 118. DP array 102 also includes a DP array interface 120 having a plurality of interface tiles 122.

In the example, compute tiles 116, memory tiles 118, and interface tiles 122 are arranged in an array (e.g., a grid) and are hardwired. Each compute tile 116 can include one or more cores (e.g., a processor) and a memory (e.g., a random-access memory (RAM)). Each memory tile 118 may include a memory (e.g., a RAM). In one example implementation, cores of compute tiles 116 may be implemented as custom circuits that do not execute program code. In another example implementation, cores of compute tiles 116 are capable of executing program code stored in core-specific program memories contained within each respective core.

Figure 2A:
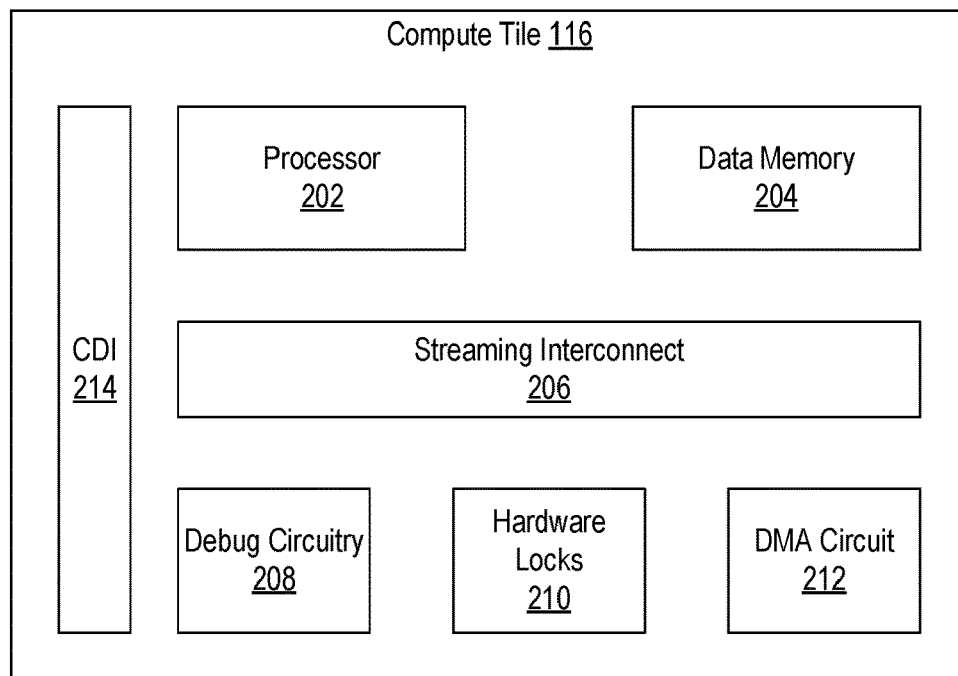
FIGS. 2A, 2B, and 2C illustrate example implementations of tiles of a data processing (DP) array.

FIG. 2A illustrates an example implementation of a compute tile 116. In the example, compute tile 116 includes a processor 202, a data memory 204, a streaming interconnect 206, debug circuitry 208, hardware locks 210, a direct memory access (DMA) circuit 212, and a configuration and debug interface (CDI) 214. Within this disclosure, DMA circuits are examples of data movers. Processor 202 may be implemented with a Very-Long Instruction word) architecture. In one or more examples, processor 202 may be implemented as a vector processor capable of performing both fixed and floating-point operations and/or a scalar processor. Data memory 204 may be implemented as a RAM. Processor 202 is capable of directly accessing the data memory 204 in the same compute tile and in other adjacent compute tiles 116. Processor 202 also has direct connections to other processors 202 in adjacent compute tiles 116 so that data may be conveyed directly between processors 202 without writing such data to a data memory 204 (e.g., without using shared memory to communicate data and/or without conveying data over a streaming interconnect 206).

Streaming interconnect 206 provides dedicated multi-bit data movement channels connecting to streaming interconnects 206 in each adjacent tile in the north, east, west, and south directions of DP array 102. DMA circuit 212 is coupled to streaming interconnect 206 and is capable of performing DMA operations to move data into and out from data memory 204 by way of streaming interconnect 206. Hardware locks 210 facilitate the safe transfer of data to/from data memory 204 and other adjacent and/or non-adjacent tiles. CDI 214 may be implemented as a memory mapped interface providing read and write access to any memory location within compute tile 116. Compute tile 116 may include other circuit blocks not illustrated in the general example of FIG. 2A.

Figure 2B:
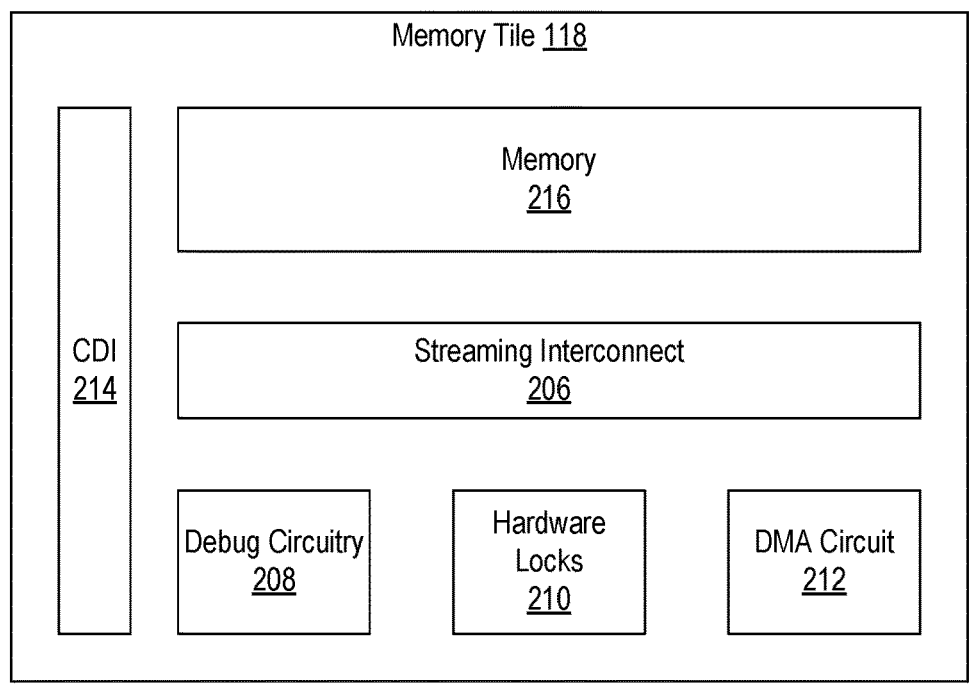

FIG. 2B illustrates an example implementation of a memory tile 118. In the example, memory tiles 118 include a memory 216, a streaming interconnect 206, debug circuitry 208, hardware locks 210, a DMA circuit 212, and a CDI 214. Memory 216 may have a larger capacity than data memory 204. DMA circuit 212 of each memory tile 118 may access the memory 216 within the same tile as well as the memory 216 of one or more adjacent memory tiles. In general, memory tile 118 is characterized by the lack of a processor and the inability to execute program code. Each memory tile 118 may be read and/or written by any of compute tiles 116 and/or interface tiles 122 by way of interconnected streaming interconnects 206. Memory tile 118 may include other circuit blocks not illustrated in the general example of FIG. 2B.

DP array interface 120 connects compute tiles 116 and/or memory tiles 118 to other resources of architecture 100. As illustrated, DP array interface 120 includes a plurality of interconnected interface tiles 122 organized in a row. In one example, each interface tile 122 may have a same architecture. In another example, interface tiles 122 may be implemented with different architectures where each different interface tile architecture supports communication with a different type of resource (e.g., subsystem) of architecture 100. Interface tiles 122 of DP array interface 120 are connected so that data may be propagated from one interface tile to another bi-directionally. Each interface tile is capable of operating as an interface for the column of compute tiles 116 and/or memory tiles 118 directly above.

Figure 2C:
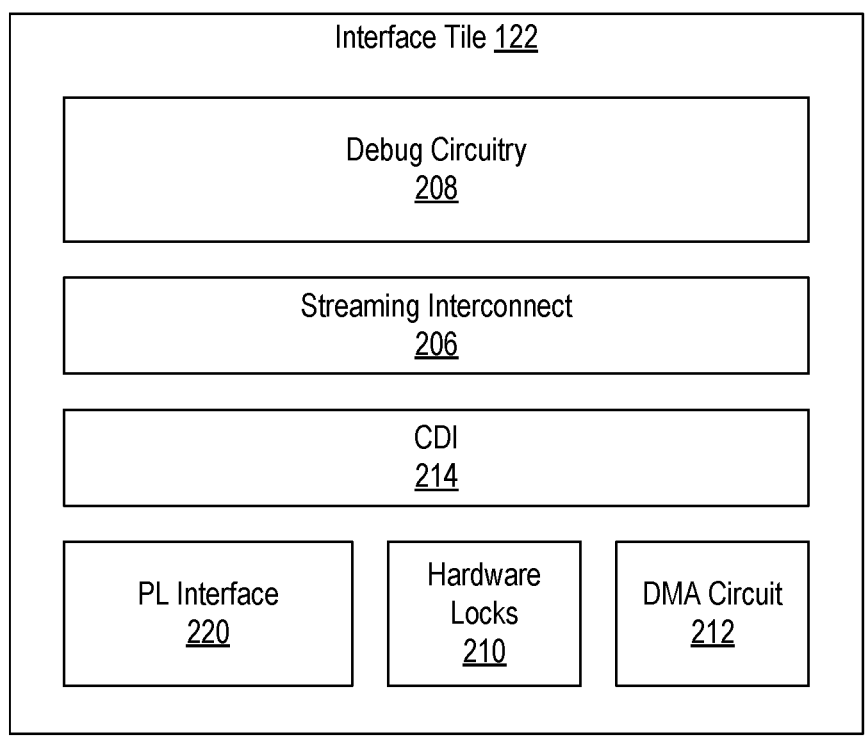

FIG. 2C illustrates an example implementation of an interface tile 122. In the example, interface tile 122 includes a PL interface 220, a streaming interconnect 206, debug circuitry 208, hardware locks 210, a DMA circuit 212, and a CDI 214. Interface tile 122 may include other circuit blocks not illustrated in the general example of FIG. 2C. The example interface tile 122 of FIG. 2C is capable of communicating with the PL 104 via PL interface 220 and NoC 108 via DMA circuit 212. Other example architectures for interface tile 122 may omit interface 220 or omit DMA circuit 212.

PL 104 is circuitry that may be programmed to perform specified functions. As an example, PL 104 may be implemented as field programmable gate array type of circuitry. PL 104 can include an array of programmable circuit blocks. The programmable circuit blocks may include, but are not limited to, RAMs 124 (e.g., block RAMs of varying size), digital signal processing (DSP) blocks 126 capable of performing various multiplication operations, and/or configurable logic blocks (CLBs) 128 each including one or more flip-flops and a lookup table. As defined herein, the term "programmable logic" means circuitry used to build reconfigurable digital circuits. The topology of PL 104 is highly configurable unlike hardwired circuitry. Connectivity among the circuit blocks of PL 104 may be specified on a per-bit basis while the tiles of DP array 102 are connected by multi-bit data paths (e.g., streams) capable of packet-based communication.

PS 106 is implemented as hardwired circuitry that is fabricated as part of architecture 100. PS 106 may be implemented as, or include, any of a variety of different processor types each capable of executing program code.

For example, PS 106 may include a central processing unit (CPU) 130, one or more application processing units (APUs) 132, one or more real-time processing units (RPUs) 134, a level 2 (L2) cache 136, an on-chip memory (OCM) 138, an Input/Output Unit (IOU) 140, each interconnected by a coherent interconnect 142. The example CPU and/or processing units of PS 106 may be implemented using any of a variety of different types of architectures. Example architectures that may be used to implement processing units of PS 106 may include, but are not limited to, an ARM processor architecture, an x86 processor architecture, a graphics processing unit (GPU) architecture, a mobile processor architecture, a DSP architecture, combinations of the foregoing architectures, or other suitable architecture that is capable of executing computer-readable instructions or program code.

NoC 108 is a programmable interconnecting network for sharing data between endpoint circuits in architecture 100. NoC 108 may be implemented as a packet-switched network. The endpoint circuits can be disposed in DP array 102, PL 104, PS 106, and/or selected HCBs 112. NoC 108 can include high-speed data paths with dedicated switching. In an example, NoC 108 includes one or more horizontal paths, one or more vertical paths, or both horizontal and vertical path(s). NoC 108 is an example of the common infrastructure that is available within architecture 100 to connect selected components and/or subsystems.

Being programmable, nets that are to be routed through NoC 108 may be unknown until a design is created and routed for implementation within architecture 100. NoC 108 may be programmed by loading configuration data into internal configuration registers that define how elements within NoC 108 such as switches and interfaces are configured and operate to pass data from switch to switch and among the NoC interfaces to connect the endpoint circuits. NoC 108 is fabricated as part of architecture 100 (e.g., is hardwired) and, while not physically modifiable, may be programmed to establish logical connectivity between different master circuits and different slave circuits of a user circuit design.

PMC 110 is a subsystem within architecture 100 that is capable of managing the other programmable circuit resources (e.g., subsystems) across the entirety of architecture 100. PMC 110 is capable of maintaining a safe and secure environment, booting architecture 100, and managing architecture 100 during normal operations. For example, PMC 110 is capable of providing unified and programmable control over power-up, boot/configuration, security, power management, safety monitoring, debugging, and/or error handling for the different subsystems of architecture 100 (e.g., DP array 102, PL 104, PS 106, NoC 108, and/or HCBs 112). PMC 110 operates as a dedicated platform manager that decouples PS 106 and from PL 104. As such, PS 106 and PL 104 may be managed, configured, and/or powered on and/or off independently of one another.

HCBs 112 are special-purpose or application specific circuit blocks fabricated as part of architecture 100. Though hardwired, HCBs 112 may be configured by loading configuration data into control registers to implement one or more different modes of operation. Examples of HCBs 112 may include input/output (I/O) blocks (e.g., single-ended and pseudo differential I/Os), transceivers for sending and receiving signals to circuits and/or systems external to architecture 100 (e.g., high-speed differentially clocked transceivers), memory controllers, cryptographic engines, digital-to-analog converters (DACs), analog-to-digital converters (ADCs), and the like. In another aspect, one or more HCBs 112 may implement a RAM.

The various programmable circuit resources illustrated in FIG. 1 may be programmed initially as part of a boot process. During runtime, the programmable circuit resources may be reconfigured. In one aspect, PMC 110 is capable of initially configuring DP array 102, PL 104, PS 106, and NoC 108. At any point during runtime, PMC 110 may reconfigure all or a portion of architecture 100. In some cases, PS 106 may configure and/or reconfigure PL 104 and/or NoC 108 once initially configured by PMC 110.

Architecture 100 is provided as an example. Other example architectures for an IC may omit certain subsystems described herein and/or include additional subsystems not described herein. Further, the particular subsystems described herein may be implemented differently to have fewer or more components than shown. Particular components common across different tiles of DP array 102 and having same reference numbers such as streaming interconnects 206, CDIs 214, DMA circuits 212, and the like have substantially the same functionality from one tile to another. It should be appreciated, however, that the particular implementation of such circuit blocks may differ from one type of tile to another. As an illustrative and non-limiting example, the number of ports of the streaming interconnect 206 may be different for a compute tile 116 compared to a memory tile 118 and/or an interface tile 122. Similarly, the number of channels of a DMA circuit 212 may be different in a compute tile 116 compared to a memory tile 118 and/or an interface tile 122. Appreciably, in other examples, the circuit blocks may be implemented the same across different tiles.

Figure 3A:
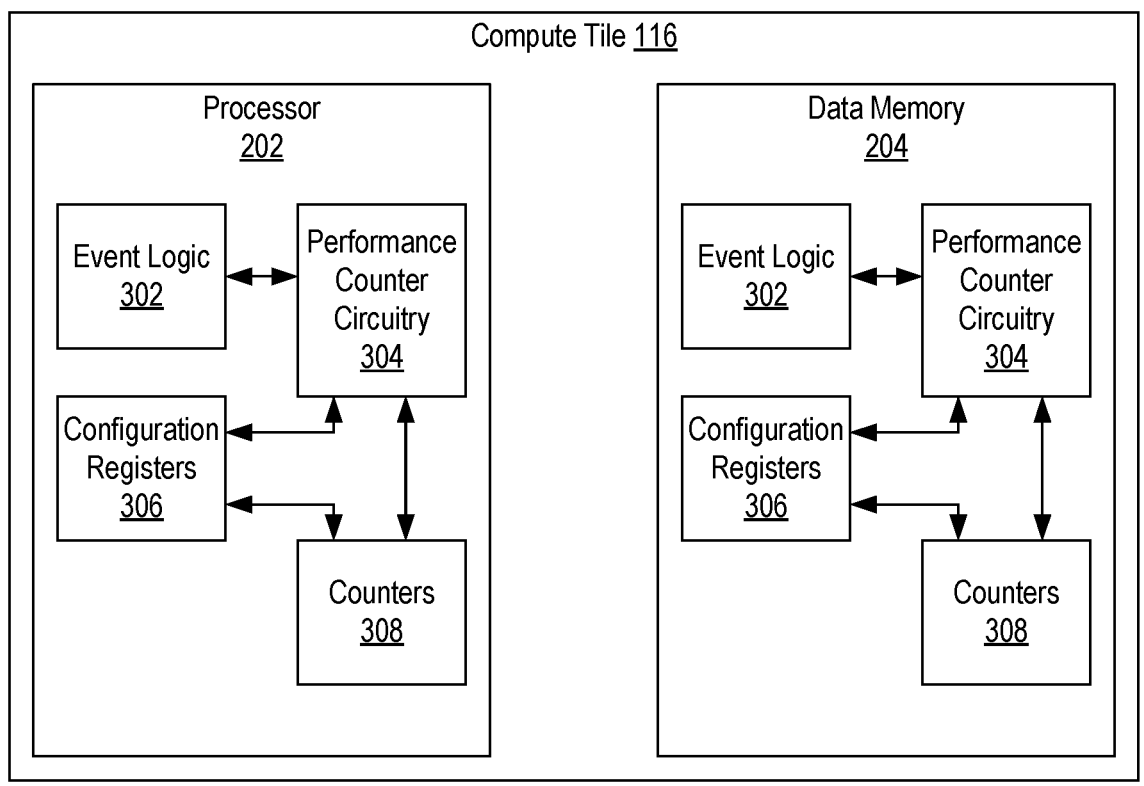
FIGS. 3A and 3B, taken collectively, illustrate example debug circuitry included in tiles of the DP array.
Figure 3B:
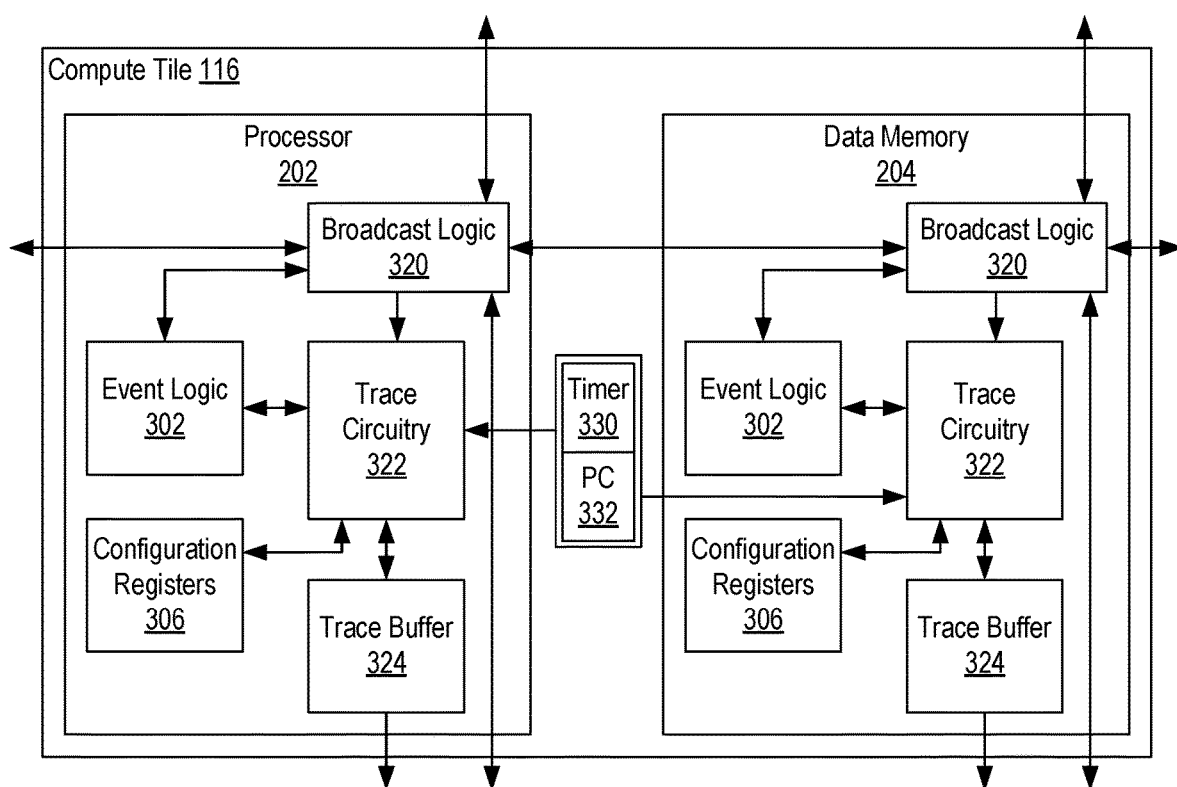

FIGS. 3A and 3B, taken collectively, illustrate various aspects of the debug circuitry 208 included in the various tiles of DP array 102. Referring to FIG. 3A, the debug circuitry 208 of compute tile 116 may include a set of circuit blocks that are configurable to implement trace functionality and profiling functionality. The circuit blocks include event logic 302, performance counter circuitry 304, configuration registers 306, and counters 308. As illustrated, the circuit blocks are implemented in both processor 202 and in data memory 204.

Event logic 302 is capable of detecting a plurality of different types of trace events within processor 202. Examples of trace events that may be detected by event logic 302 may include, but are not limited to, function calls, function returns, stalls, data transfers, etc. The particular types of trace events that are to be detected may be specified by configuration registers 306. For example, configuration registers 306 may have space for specifying up to 8 different types of trace events to be detected out of a possible 128 different trace events. The occurrence of particular trace events during the time in which trace is conducted may be counted by respective ones of counters 308, which may be controlled and/or managed by performance counter circuitry 304 based on other settings stored in configuration registers 306.

Debug circuitry 208 may be started and/or stopped in response to the occurrence of particular events as defined by data stored in configuration registers 306. For example, the monitoring and detection of trace events may be initiated in response to the detection of a particular event considered a start event and stopped in response to the detection of a particular event considered a stop event.

Configuration registers 306 may be programmed with user-specified runtime settings that define the start and stop conditions and the particular trace events that event logic 302 is to monitor for. In one or more examples, configuration registers 306 may be programmed after a design is loaded into DP array 102 for execution. In one or more other examples, configuration registers 306 may be programmed, at least initially, with configuration data included in the particular design that is compiled and loaded into the DP array 102 for execution.

Referring to FIG. 3B, the debug circuitry 208 of compute tile 116 may include a set of circuit blocks that are configurable to implement further trace functionality. The circuit blocks include event logic 302, broadcast logic 320, trace circuitry 322, configuration registers 306, and trace buffer 324. As illustrated, the circuit blocks are implemented in processor 202 and in data memory 204. Further, the trace circuitry 322 in processor 202 and data memory 204 is coupled to a timer 330 and a program counter 332 so that each trace event may be associated or stored with a timer value and/or a program counter value.

In the example, events generated by event logic 302 may be provided to broadcast logic 320 and conveyed to one or more different broadcast logic 320 circuits in the same tile and/or in different tiles of DP array 102. This allows trace events to be conveyed to the broadcast logic 320 in data memory 204 in the same tile or to broadcast logic 320 of a different tile and/or different type of tile where the events may be stored in a different trace buffer 324 and/or used to start trace in the destination tile or portion of the tile. Trace events may be conveyed from broadcast logic 320 to trace circuitry 322, where the trace events may be associated with the timer value and/or program counter and then stored in trace buffer 324. A stream of trace data may be output from trace buffer 324 for output from DP array 102. Broadcast functionality, e.g., which events are broadcast from each respective broadcast logic 320 and the destination broadcast logic 320 that receives such events, is configurable at runtime of DP array 102 and the user design.

While the examples of FIGS. 3A and 3B focus on compute tiles 116, it should be appreciated that the circuitry illustrated in FIGS. 3A and/or 3B also may be implemented in memory tiles 118 and/or interface tiles 122 as debug circuitry 208. In the case of memory tiles 118 and interface tiles 122, the circuitry may or may not be replicated as illustrated in the examples of FIG. 3.

Figure 4:
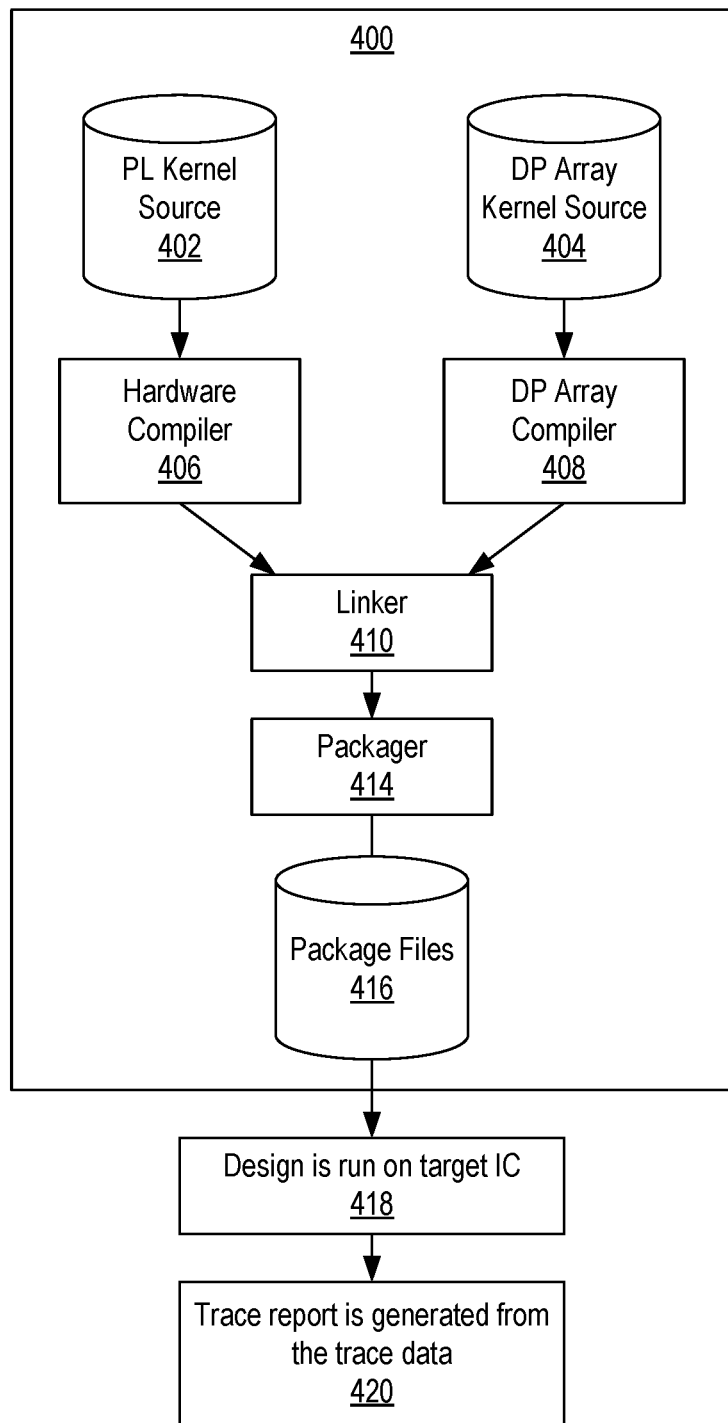
FIG. 4 illustrates an example method of performing hardware trace, trace data offload, and trace data analysis.

FIG. 4 illustrates an example method of performing hardware trace and analysis. The method of FIG. 4 includes a design flow 400 for implementing a design in an IC having an architecture as described in connection with FIG. 1. Design flow 400 may be performed by a data processing system. An example of a data processing system is described in connection with FIG. 7.

As shown, source code for a user design specifying one or more programmable logic kernels (e.g., PL kernel source 402) is provided to a hardware compiler 406. Hardware compiler 406 may generate placed and routed versions of the user specified PL kernels of PL kernel source 402. Source code for the user design specifying one or more data processing array kernels (e.g., DP array kernel source 404) is provided to DP array compiler 408. DP array compiler 408 may generate executable and placed versions of DP array kernels of DP array kernel source 404. The compiled PL kernel source 402 and the compiled DP array kernel source 404 are provided to linker 410.

Linker 410 receives the compiled PL kernel source 402 and the compiled DP array kernel source 404 and operates on both based on user specified compilation options. The compilation options may be specified via any of a variety of user input mechanisms. In one aspect, the compilation options may be specified as command line options. The compilation options may specify a particular offload circuit architecture that is to be implemented in the target IC to connect DP array 102 with one or more other circuits for offloading trace data.

Linker 410 is capable of including a particular offload circuit architecture specified by the user as a compilation option. Linker 410, for example, adds the specified offload circuit architecture and connects the specified offload circuit architecture to the DP array 102 and to another circuit external to DP array 102 such as NoC 108. Trace data may be output from DP array 102 as one or more different streams of trace data. The offload circuit architecture may be one of two different possible types. One type of offload circuit architecture is implemented as one or more data paths implemented or created in PL 104. In general, one or more data paths may be implemented to convey the streams of trace data. In some examples, one data path may be created in PL 104 for each different stream of trace data that is output from DP array 102. Other implementation options, however, are available. Each data path may have a data mover (circuit) to be described herein in greater detail. Another type of offload circuit architecture is implemented using the DMA circuit 212 of one or more interface tiles 122. As noted, a DMA circuit 212 is a type of data mover circuit.

An example of a user provided command that may be entered into a command line to specify compilation options is illustrated in Listing 1.

Listing 1 aiecompiler <options> --event-trace=runtime --num-trace-streams=16 -trace-plio-width=64 --event-trace-port=plio In the example of Listing 1, the compilation parameters include the number of streams of trace data to be output from DP array 102 to be 16. Further, compilation parameters specify the PLIO (Programmable Logic I/O) trace data offload option indicating that the offload circuit architecture is to be implemented in PL 104. Given the configurability of PL 104, the width of each stream of trace data and the corresponding data path through PL 104 also may be specified. The example of Listing 1 illustrates that the user may specify the number of streams of trace data that will be output from DP array 102. In a DMA-based implementation of the offload circuit architecture (e.g., specified using a Global Memory I/O or "GMIO" compilation option), the width of the streams is fixed. As part of placing and routing the DP array kernels of DP array kernel source 404, DP array compiler 408 further generates a routing for the trace data based on the number of streams specified by the user.

From the linked components generated by linker 410, packager 414 is capable of generating one or more output files as package files 416. Package files 416 may include binary files/images that may be loaded into the target IC to implement the user design (e.g., PL kernel source 402 and DP array kernel source 404) within the target IC along with the offload circuit architecture. Packager 414, for example, is capable of generating the files required for the target IC to boot and run the user design for performing trace.

In one or more example implementations, linker 410 is capable of generating a metadata section that may be included in package files 416. The metadata section may specify information such as DP array kernel to tile mapping, instance names for functions of kernels, addresses, versions, and/or other properties of DP array kernels as compiled and mapped to tiles of DP array 102. As kernels are included in graphs, the metadata further specifies graph to tile mapping.

While configuration data for loading into configuration registers 306 may be included in package files 416, in other cases, such data may be written to the configuration registers at runtime of a design responsive to user-provided commands. For example, the host runtime may receive user commands (e.g., in real-time), parse the commands using the metadata and/or other user-specified runtime settings, generate configuration data for configuration registers 306 of selected tiles of DP array 102 used by the design for performing trace, and provide such data to the target IC to be written to configuration registers 306.

In block 418, the design is run on the target IC. More particularly, the design is loaded into the target IC and is executed (or started). The design is configured to perform trace functions. In other examples, the design is configured to perform profiling functions described hereinbelow in greater detail. Accordingly, during operation, one or more tiles of the DP array 102 generate and output trace data and/or profiling data that may be stored in a memory. In block 420, a report is generated from the trace data and/or profiling data. The trace and/or profiling data may be provided to, or obtained by, a data processing system that executes one or more analysis tools. The analysis tools are capable of processing the trace data and/or profiling data to generate a report.

Figure 5:
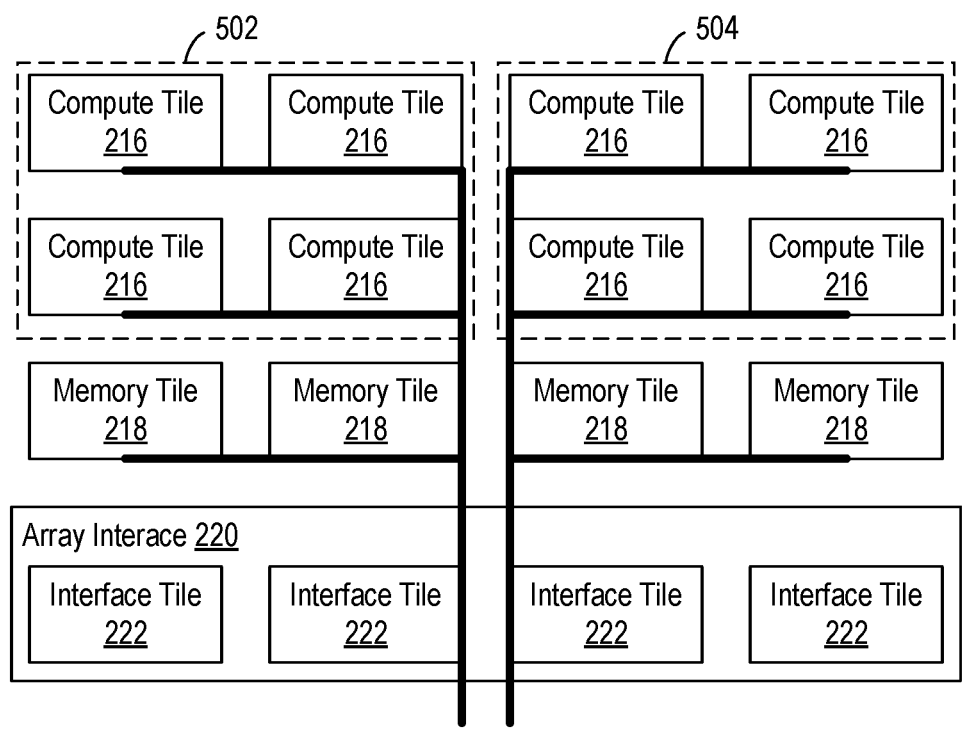
FIG. 5 illustrates an example implementation of a design for a DP array that uses a user-specified number of streams of trace data.

FIG. 5 illustrates an example implementation of a design for DP array 102 where the user has specified 2 streams of trace data as a compilation option. For purposes of illustration, each of compute tiles 116 and each of memory tiles 118 is used by the user's design. Within this disclosure, each tile that is used by a user's design is referred to as an active tile. In other cases, not all tiles may be used to implement/execute a user's design. Thus, not all tiles of DP array 102 may be active tiles.

In the example, DP array compiler 408 has connected each active tile for purposes of routing trace data to a stream. Each tile that is configured to perform trace contributes trace data to a particular stream as routed in DP array 102. Thus, the particular streams for conveying trace data as implemented in DP array 102 may be shared among multiple tiles. For example, the user specifies the number of streams desired as a compilation option. A "stream" within the DP array 102 refers to a data path or route through one or more stream switches of tiles of the DP array 102 through which data (e.g., trace data) is conveyed. DP array compiler 408 creates connections for each tile used in the user's design to a stream of trace data. If the user specifies 16 streams of trace data and there are 64 active tiles in the DP array 102, DP array compiler 408 will create the 16 streams. As an example, each stream may have 4 different tiles connected thereto that contribute trace data to the stream. Thus, streams may include trace data generated by more than one tile. Appreciably, however, the particular number of tiles on a given stream may depend on other factors such as the placement of the kernels to tiles. Thus, there is no requirement to have an even distribution of active tiles to streams.

The trace data is conveyed over ports that are available on streaming interconnects 306 (also referred to as "streamswitches"). In some tiles, trace data may be provided to streaming interconnects 306 by way of dedicated ports thereon. Once provided to a streaming interconnect 306, the trace data may be routed through any of the available ports of the stream interconnect 306. The routing is determined at compile time. In one or more other examples, tiles may include a dedicated trace data network that may operate independently of the streaming interconnects.

Within this disclosure, a particular user design for DP array 202 may include one or more graphs. Each graph may be considered a different application that executes in DP array 202, e.g., in different compute tiles 216 of DP array 202. The graphs (e.g., applications) may execute concurrently in the different tiles and also may execute independently of one another. For example, a first graph of the user design may execute to process data in one or more compute tiles of DP array 202 and output data to other subsystem(s) of the target IC. A second graph of the user design may execute in one or more other or different compute tiles of DP array 202 and output data to other subsystems of the target IC. The first and second graphs are implemented concurrently in DP array 202 and execute concurrently. The second graph may receive data from sources that are the same and/or different than the sources of data for the first graph. In some cases, data from the first graph may be processed through one or more other subsystems of the target IC and provided to the second graph for additional processing.

For purposes of illustration, the user design of FIG. 5 may include two different graphs shown as graph 502 and graph 504. In this example, graph 502 is implemented using 4 compute tiles. Graph 504 is implemented using 4 different compute tiles. A user design may include a single graph or two or more graphs as described herein.

Figure 6A:
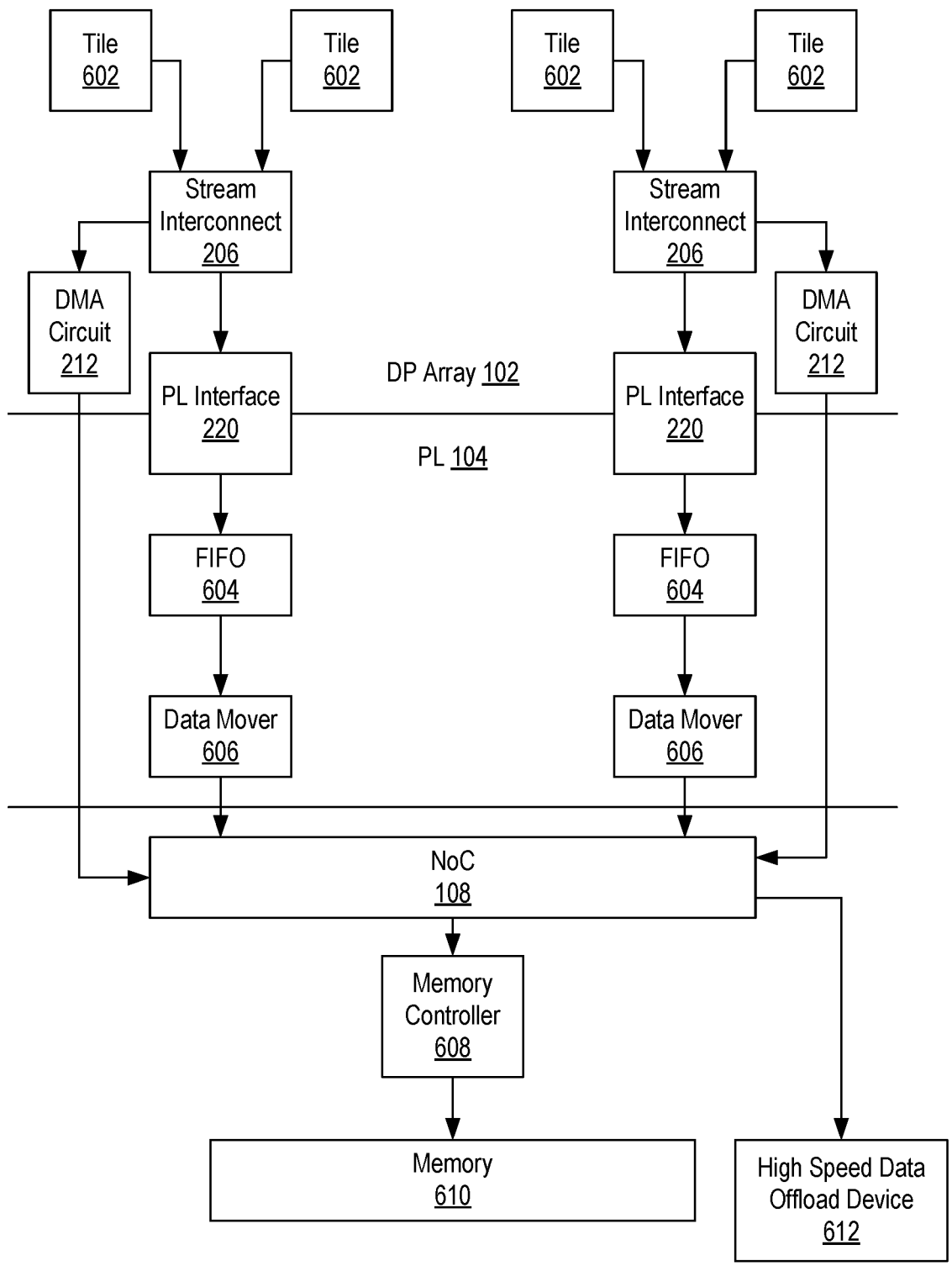
FIGS. 6A, 6B, and 6C illustrate examples of offload circuit architectures that may be implemented to convey trace data from a DP array.
Figure 6B:
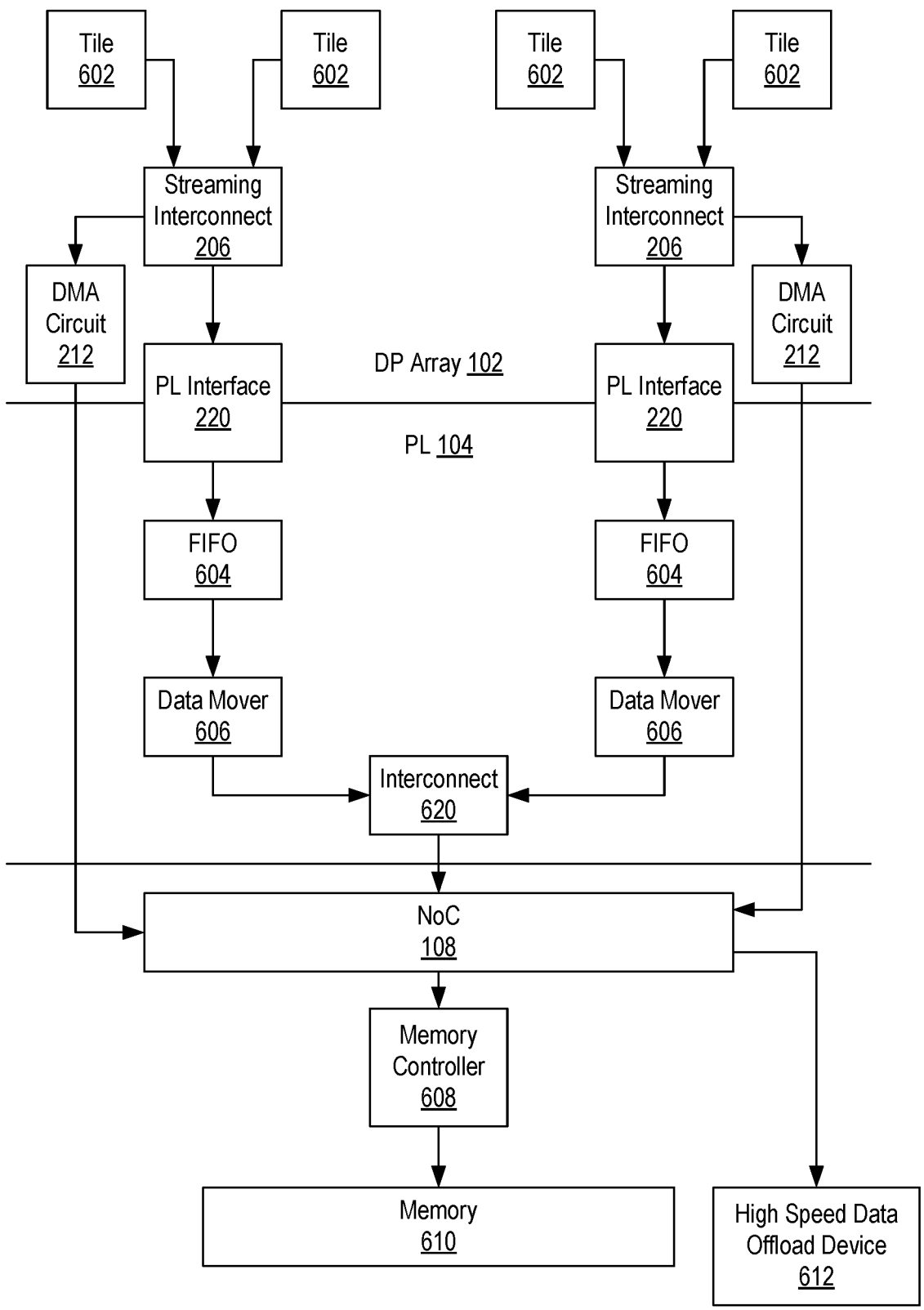
Figure 6C:
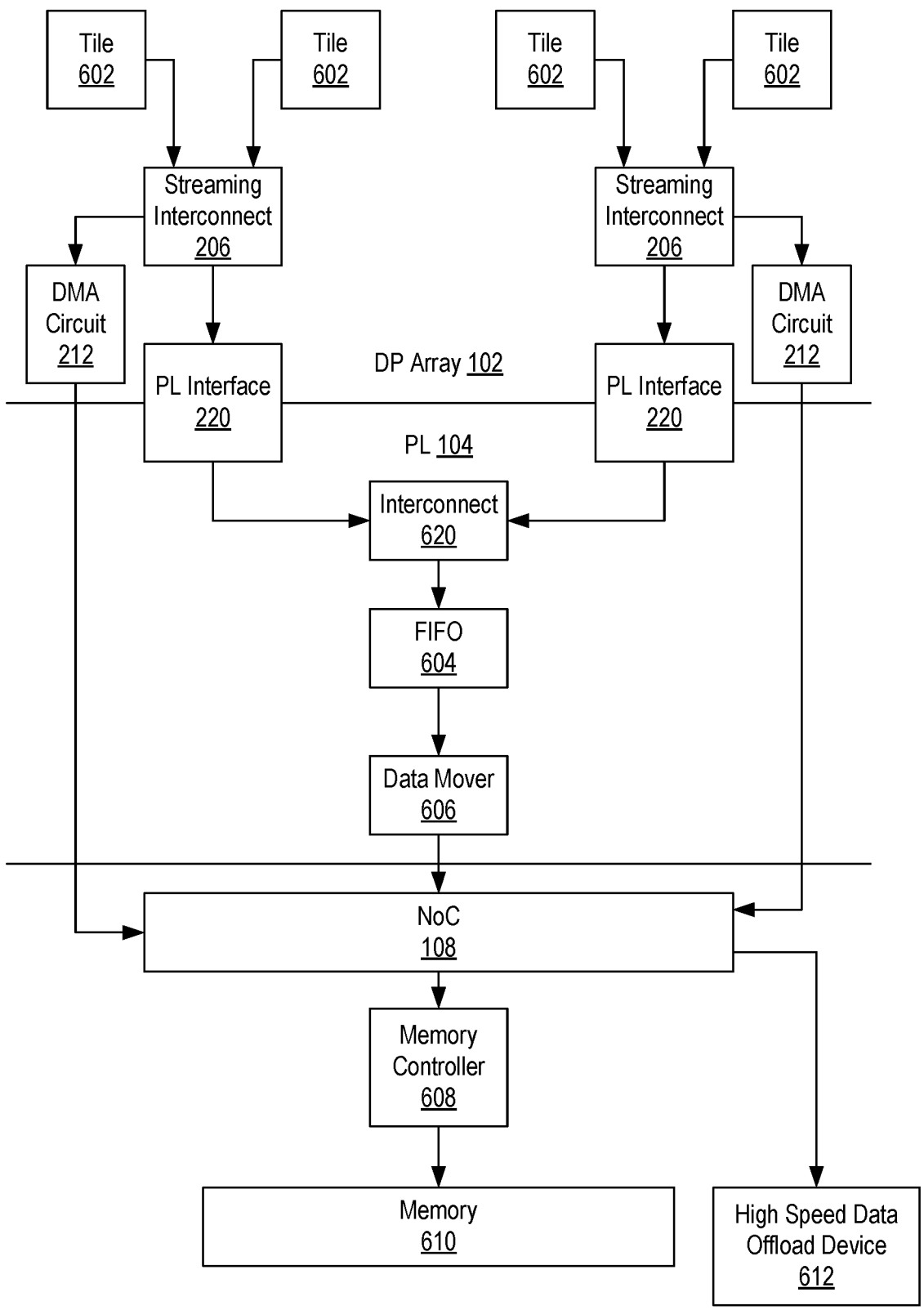

FIGS. 6A, 6B, and 6C illustrate examples of the offload circuit architectures that may be implemented to convey trace data from DP array 102. In the example of FIG. 6A, tiles 602 may represent compute tiles 116, memory tiles 118, interface tiles 122, or any combination thereof. For purposes of illustration, the user has selected, by way of compilation options, to implement two streams of trace data. In the example, each tile 602 outputs a single stream of trace data. In other examples, tiles 602 may be implemented to output two or more streams of trace data. The data output from tiles 602 is not considered equivalent to the streams (e.g., number of streams) specified by the user. Streaming interconnects 206, for example, are capable of combining streams received from different ones of tiles 602 based on the routing to form the particular number of user-specified streams that are output from DP array 102, which is 2 in this case.

The examples of FIGS. 6A, 6B, and 6C illustrate the two different types of offload circuit architectures being implemented. For purposes of illustration, both are illustrated as being implemented concurrently. It should be appreciated, however, that only one of the two types illustrated would be implemented for a given user design.

Referring to FIG. 6A, as illustrated, trace data from active tiles 602 of DP array 102 are routed to provide trace data to respective streaming interconnects 206 disposed in one or more of the tiles of DP array 102. In the case where the user has selected the DMA-based option (e.g., GPIO), the trace data is routed to DMA circuits 212. DMA circuits 212 may be directly coupled to NoC 108 to provide trace data thereto. In the example, each DMA circuit 212 provides one stream of trace data. Though the connections from DMA circuits 212 to NoC 108 are shown as traversing through PL 104, it should be appreciated that DMA circuits 212 may be directly coupled to NoC 108 so as not to utilize or require any circuit resources of PL 104 to establish the connections illustrated.

In the case where the user has selected the PL-based option, the trace data is routed to and through PL 104. In the example, each data path includes a FIFO 604 coupled to a data mover 606. Each data mover 606 couples to NoC 108. Each FIFO 604 couples to a PL interface 220 of an interface tile 122. The FIFOs 604 and the data movers 606 are inserted into the design as discussed during the linking phase. In one aspect, the depth of each FIFO 604 may be specified by the user as compilation parameters.

In the example of FIG. 6, both the PL-based option and the DMA-based option utilize data movers that that are configured to convert streaming data to memory-mapped data. The data movers (e.g., 606 and 212) connect to each stream of trace data (e.g., an Advanced Microcontroller Bus Architecture (AMBA) eXtensible Interface (AXI) stream), convert the stream to memory-mapped data, and may function as master circuits that write the trace to memory 610 via NoC 108. The data movers may write the data at high data rates. As part of the linking process of design flow 400, linker 410 defines the Quality-of-Service (QoS) values for routing the trace data through pathways of NoC 108 based on bandwidth estimates for the trace data that is expected to be generated. The estimates may be initially performed by DP array compiler 408 compiler and delivered to linker 410. The QoS values may be refined by linker 410 to ensure that system-level limits and specifications for the user's design also are met.

Trace data may be offloaded from NoC 108 to a high-speed data offload device 612 that is external to the target IC and includes circuitry capable of providing the bandwidth necessary to store the trace data. Trace data also may be offloaded to a memory 610 from NoC 108 by way of memory controller 608. Memory controller 608 is an example of an HCB 112. Memory 610 may be a DDR memory and may be implemented as volatile memory 754 of FIG. 7 (e.g., an external memory). In one or more other examples, memory 610 may be implemented as an internal memory (e.g., an HCB 112).

In one aspect, as part of the design flow, trace buffers within memory 610 may be allocated to each data mover. The depth of the buffers may be specified by the user as a single value that is divided equally amongst the data movers. In the alternative, the user may specify the depth of each buffer individually. In still another example implementation, the depth of the buffers may be automatically determined and/or adjusted by program code that controls trace (e.g., the host runtime and/or kernels). The program code may determine the depths and/or adjust the depths based on the amount of trace data being output or stored in memory 610 (e.g., by communicating with the data movers and/or memory controller 608).

Whether trace data is written to memory 610 or to high-speed data offload device 612, the trace data may be obtained by a host system (e.g., a computer) and analyzed to generate a trace report.

In the example of FIG. 6A, memory controller 608 is illustrated as the merge point where the various streams of trace data are merged together as data traffic written to memory 610. In the example of FIG. 6A, each stream of trace data requires its own entry point to NoC 108, e.g., its own NoC master circuit to place the data onto NoC 108.

In another example implementation, the merge point and/or points may be adjusted by including further interconnect circuitry. FIGS. 6B and 6C illustrate alternative implementations for the PLIO implementation option. The example of FIG. 6B incorporates an interconnect 620 as a merge point after data movers 606. As shown, each data mover 606 outputs data to interconnect 620. Interconnect 620 is connected to NoC 108. In this example, only one entry point to NoC 108 is needed as the two traces are merged prior to entry into NoC 108.

In the example of FIG. 6C, the merge point implemented by interconnect 620 is moved prior to FIFOs 604. As shown, each PL interface 220 connects to interconnect 620. From interconnect 620, a single FIFO 604 is used along with a single data mover 606 that connects to NoC 108 through a single entry point. In each of FIGS. 6B and 6C, the number of entry points into NoC 108 is reduced for a given number of streams of trace data. The NoC master circuits are hardened circuit blocks available in limited numbers. In the case where streams are merged, the number of buffers needed may not coincide with the number of data movers used.

Figure 7:
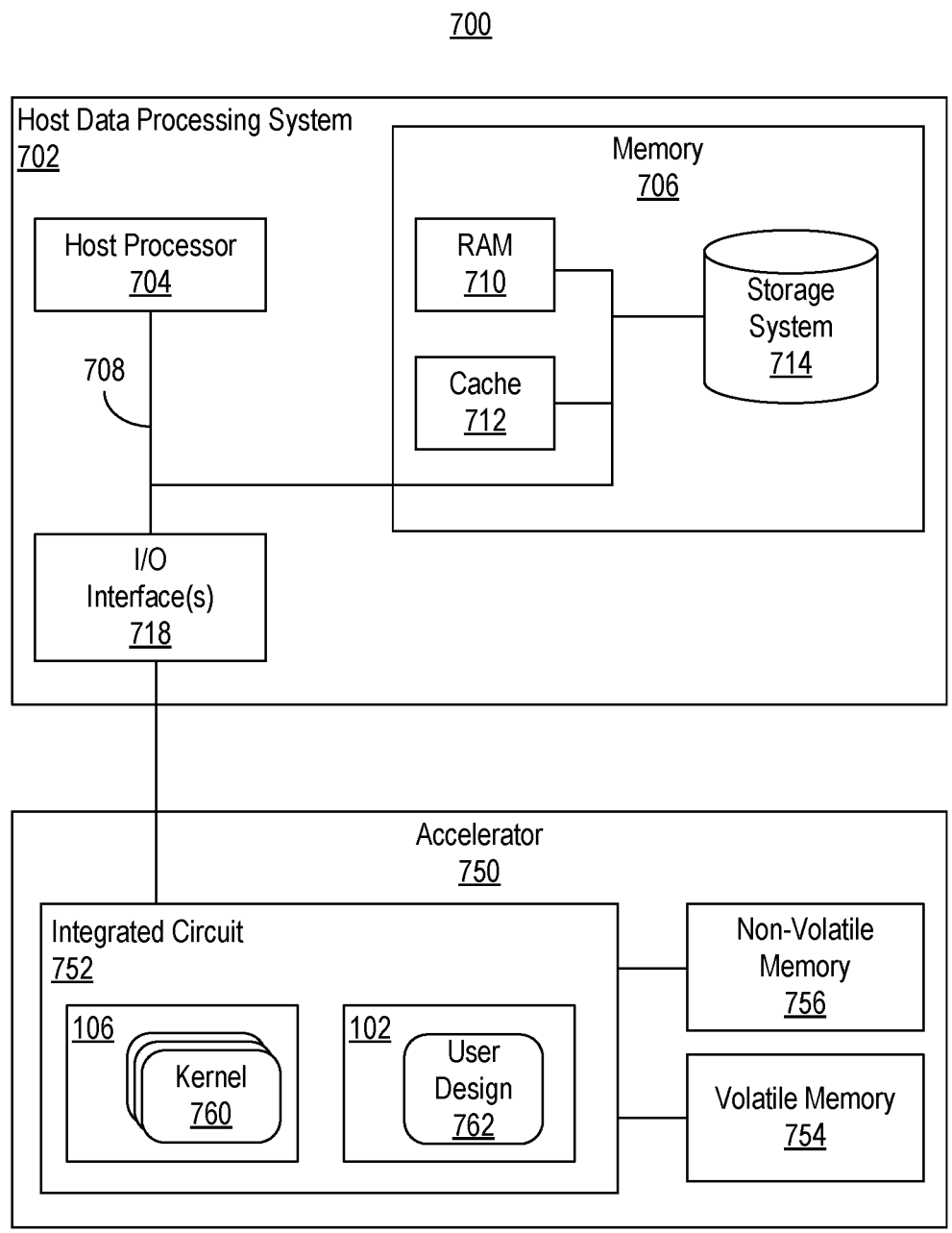
FIG. 7 illustrates an example system including a host data processing system and an accelerator for use with the inventive arrangements.

FIG. 7 illustrates an example system 700 including a host data processing system (host system) 702 and an accelerator 750 for use with the inventive arrangements. Host system 702 is an example of a computer that is capable of performing the design flow 400 of FIG. 4, the trace functions and/or trace analysis, and/or profiling functions described herein. It should be appreciated that any of a variety of data processing systems may implement the various functions described herein. In some examples, different computers may perform different operations as described. For example, one computer may perform a design flow while another performs trace analysis. For certain operations such as those of design flow 400, accelerator 750 does not need to be coupled to the data processing system. Further, host system 702 is capable of executing the host runtime to communicate with IC 752 on accelerator 750.

As defined herein, the term "data processing system" or "host data processing system" means one or more hardware systems configured to process data, each hardware system including at least one hardware processor and memory, wherein the hardware processor is programmed with computer-readable instructions that, upon execution, initiate operations. Host system 702 can include a host processor 704, a memory 706, and a bus 708 that couples various system components including memory 706 to host processor 704.

Host processor 704 may be implemented as one or more hardware circuits, e.g., integrated circuits, capable of carrying out instructions contained in program code. In an example, host processor 704 is implemented as a CPU. Host processor 704 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 708 represents one or more of any of a variety of communication bus structures. By way of example, and not limitation, bus 708 may be implemented as a Peripheral Component Interconnect Express (PCIe) bus. Host system 702 typically includes a variety of computer system readable media. Such media may include computer-readable volatile and non-volatile media and computer-readable removable and non-removable media.

Memory 706 can include computer-readable media in the form of volatile memory, such as RAM 710 and/or cache memory 712. Host system 702 also can include other removable/non-removable, volatile/non-volatile computer storage media. By way of example, storage system 714 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

In such instances, each can be connected to bus 708 by one or more data media interfaces. Memory 706 is an example of at least one computer program product.

Memory 706 is capable of storing computer-readable program instructions that are executable by host processor 704. For example, the computer-readable program instructions can include an operating system, one or more application programs, other program code such as the host runtime, and program data. Host processor 704, in executing the computer-readable program instructions, is capable of performing the various operations described herein that are attributable to a computer. It should be appreciated that data items used, generated, and/or operated upon by host system 702 are functional data structures that impart functionality when employed by host system 702.

As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Host system 702 may include one or more Input/Output (I/O) interfaces 718 communicatively linked to bus 708. I/O interface(s) 718 allow host system 702 to communicate with one or more external devices such as accelerator 750. Examples of I/O interfaces 718 may include, but are not limited to, network cards, modems, network adapters, hardware controllers, etc. Examples of external devices also may include devices that allow a user to interact with host system 702 (e.g., a display, a keyboard, and/or a pointing device).

Host system 702 is only one example implementation. Host system 702 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

In an example implementation, I/O interface 718 may be implemented as a PCIe adapter. Host system 702 and accelerator 750 communicate over a communication channel, e.g., a PCIe communication channel. Accelerator 750 may be implemented as a circuit board that couples to data processing system 702.

Accelerator 750 may, for example, be inserted into a card slot, e.g., an available bus and/or PCIe slot, of host system 702. Accelerator 750 may be considered a peripheral device of host system 702.

Accelerator 750 may include an IC 752. IC 752 may be implemented using the example architecture of FIG. 1 or another similar architecture. Accelerator 750 also may include a volatile memory 754 coupled to IC 752 and a non-volatile memory 756 also coupled to IC 752. Volatile memory 754 may be implemented as a RAM. Non-volatile memory 756 may be implemented as flash memory.

In the example of FIG. 7, host processor 704 is capable of executing one or more user applications. Further, host processor 704 is capable of executing the host runtime. The host runtime, as executed by host processor 704, is capable of scheduling one or more kernels 760 for execution by one or more of the processing units of PS 106 within IC 752. Kernels 760 may communicate with host processor 704 and DP array 102 with user design 762 executing therein to implement trace and/or profiling.

Figure 8:
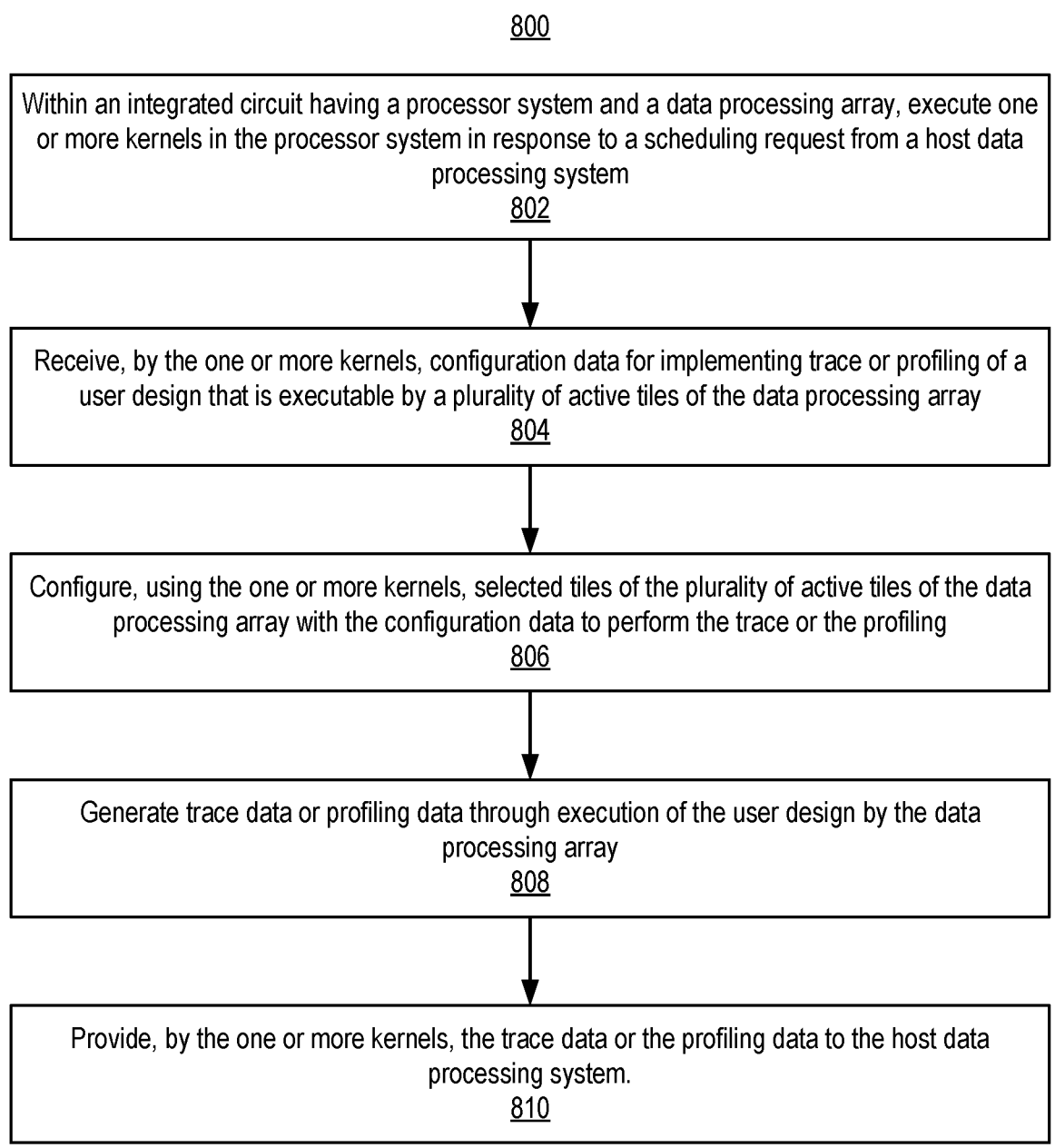
FIG. 8 illustrates an example method of operation of the system of FIG. 7.

FIG. 8 illustrates an example method 800 of operation for system 700 of FIG. 7. Method 800 may be implemented by system 700 subsequent to the user design being loaded into IC 752 for execution by, at least in part, DP array 102. In block 802, within IC 752 having PS 106 and a DP array 102, one or more kernels are executed in and/or by PS 106 in response to a scheduling request from host system 702. For example, host system 702 schedules one or more kernels to execute in PS 106. The kernel(s) are executed by one or more selected processing units of PS 106. In block 804, the one or more kernels, as executed by PS 106, receives configuration data for implementing trace or profiling of a user design that is executable by a plurality of active tiles of DP array 102. For example, host system 702 passes configuration data to the kernel(s). The configuration data is for implementing trace and/or profiling of a user design that is executable by a plurality of active tiles of DP array 102.

In block 806, using the one or more kernels as executed by PS 106, selected tiles of the plurality of active tiles of DP array 102 are configured with and/or using the configuration data to perform the trace or the profiling. For example, the kernel(s) configure selected tiles of the plurality of active tiles of DP array 102 with the configuration data to perform the trace and/or the profiling. In block 808, the trace data or the profiling data is generated through execution of the user design by DP array 102. In block 810, the one or more kernels provide the trace data or the profiling data to host system 702.

Figure 9:
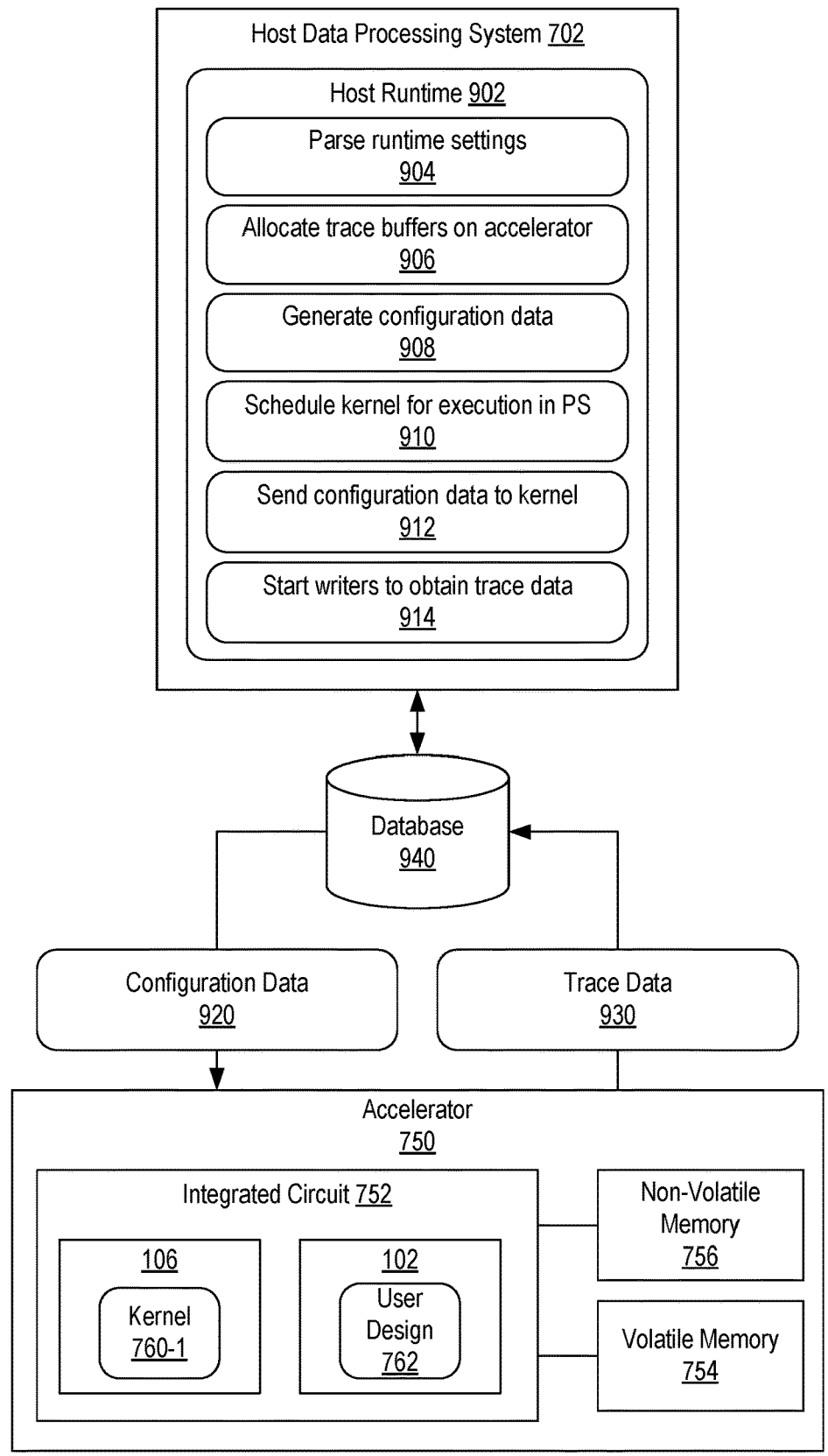
FIG. 9 illustrates another example implementation of the system of FIG. 7 for performing trace.

FIG. 9 illustrates an example implementation of system 700 configured to perform trace. In the example of FIG. 9, the offload circuit architecture is implemented in PL 104 of IC 752. As shown, host system 702 executes host runtime 902. Host runtime 902 is configured to perform trace for user design 762 as executed by DP array 102. In one or more example implementations, host runtime 902 implements a plugin framework that is capable of hosting and executing one or more plugins, where each plugin enables different functionality. For example, a trace plugin (not shown) may be executed to provide and/or augment trace functionality of host runtime 902.

In block 904, host runtime 902 parses user-specified runtime settings. The runtime settings specify particular trace operations that the user wishes to implement for the user's design. For example, the runtime settings specify the trace events to be detected, the particular tiles to perform trace, the trace start condition, and/or the trace stop condition. In block 906, host runtime 902 allocates one or more trace buffers in accelerator 750 (e.g., in memory 610 which may be an on-chip memory or volatile memory 754). In allocating the buffers, host runtime 902 determines a physical address for each buffer that is allocated.

In block 908, host runtime 902 generates configuration data 920. In the example, host runtime 902 is capable of accessing the data generated during design flow 400 of FIG. 4 (e.g., package files 416) to access the metadata. The metadata specifies which tiles of DP array 102 are used by the user design (e.g., the active tiles) and, as such, may be configured to perform trace operations. Host runtime 902 generates configuration data 920 by cross referencing the runtime settings with the metadata. Trace configuration data 920 specifies the particular parameters and/or values to be written to configuration registers 306 of the respective active tiles of DP array 102. For example, configuration data 920 specifies the particular values to be written to configuration registers 306 to implement the runtime settings in selected ones of the active tiles. Trace configuration data 920 also includes the physical addresses for the allocated buffer(s). The configuration data 920 also may include any trace delay settings.

In block 910, host runtime 902 schedules kernel 760-1 for execution in PS 106. Accordingly, kernel 760-1 begins executing in PS 106. In block 912, host runtime 902 sends trace configuration data 920 to kernel 760-1. In the example, communication between host system 702 and accelerator 750 may be implemented using a database 940. Database 940 may be implemented in a data storage device of host system 702 or accessible by host system 702 and IC 752. Database 940 may be implemented as a two-way database that facilitates data exchange between host system 702 and IC 752 and/or accelerator 750. In other examples, a database need not be used.

Kernel 760-1, in response to receiving configuration data 920, is capable of configuring trace functionality within DP array 102. That is, kernel 760-1 writes the configuration data 920 to the configuration registers 306 of selected ones of the active tiles. Kernel 760-1 also creates the buffer(s) specified by trace configuration data 920 at the designated physical addresses.

As user design 762 executes and trace is performed, trace data is stored in the allocated buffers. In one aspect, kernel 760-1 is capable of exporting the buffers to a driver of DP array 102 that executes on PS 106. The driver, for example, may be used to write trace data from DP array 102 to the buffers. Kernel 760-1 is capable of conveying trace data 930 from the buffers to host system 702. In the example of FIG. 9, kernel 760-1 writes the trace data 930 to database 940. In block 914, host runtime 902 starts writers executing in host system 702 to retrieve the trace data from database 940.

In one or more example implementations, kernel 760-1 may provide host runtime 902 with a message that indicates the success of the trace configuration operation. For example, kernel 760-1 write data to a buffer specifying whether the trace configuration (e.g., writing of configuration data to configuration registers 306) was successful and/or whether any errors and/or warnings occurred. The buffer may be passed to host runtime 902 as a message indicating success of trace configuration of DP array 102.

In the example of FIG. 9, since the offload circuit architecture is implemented in PL 104, the circuitry is implemented in IC 752 by virtue of loading the user design in the IC. No further configuration need be performed.

Figure 10:
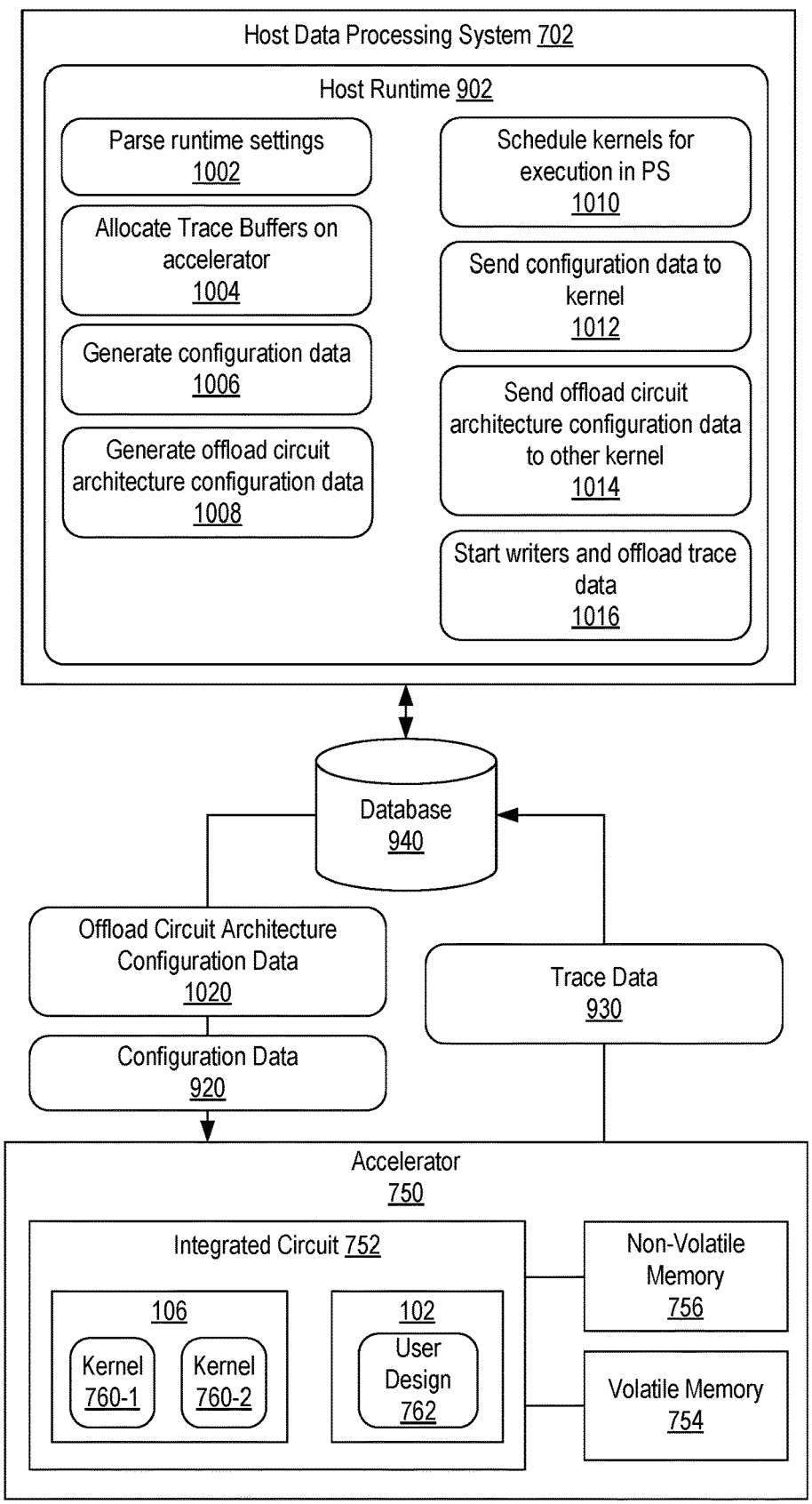
FIG. 10 illustrates another example implementation of the system of FIG. 7 for performing trace.

FIG. 10 illustrates another example implementation of system 700 configured to perform trace. In the example of FIG. 10, the offload circuit architecture is implemented using DMA circuits of DP array 102 in IC 752.

Host system 702 executes host runtime 902 substantially as described in the example of FIG. 9. In block 1002, host runtime 902 parses runtime settings. In block 1004, host runtime 902 allocates one or more trace buffers in accelerator 750. In block 1006, host runtime 902 generates configuration data 920.

In block 1008, host runtime 902 generates offload circuit architecture configuration data 1020. Offload circuit architecture configuration data 1020 is the data used to configure or program particular DMA circuits 212 in particular interface tiles 122 to implement the offload circuit architecture using the GMIO option. The offload circuit architecture configuration data 1020, as written to configuration registers of DMA circuits 212, configures the DMA circuits 212 to write data to the buffers at the physical buffer addresses specified. Offload circuit architecture configuration data 1020 may include one or more or all of the following: the one or more DMA circuits 212 of particular interface tiles 122, a number of ports of the DMA circuits 212 to be used, a burst length for the trace data handled by the DMA circuits 212, a buffer size for storing the trace data, and/or the physical addresses of the buffers as allocated for storing the trace data.

In block 1010, host runtime 902 schedules kernel 760-1 and kernel 760-2 for execution in PS 106. Kernel 760-1 may operate substantially as described in the example of FIG. 9. Kernel 760-2 is operative to write the offload circuit architecture configuration data 1020 to the respective DMA circuits 212.

In block 1012, host runtime 902 sends configuration data 920 to kernel 760-1. Kernel 760-1, in response to receiving configuration data 920, configures trace functionality within DP array 102. Kernel 760-1 further passes the buffers, as created in accelerator 750, to the driver for DP array 102. The driver, for example, may be used to write trace data from DP array 102 to the buffers.

In block 1014, host runtime 902 sends offload circuit architecture configuration data 1020 to kernel 760-2. In response to receiving offload circuit architecture configuration data 1020, kernel 760-2 configures DMA circuits 212 (e.g., writes the configuration data to configuration registers of DMA circuits 212).

As user design 762 executes and trace is performed, trace data is stored in the allocated buffers. Kernel 760-1 is capable of conveying trace data 930 from the buffers to host system 702 (e.g., database 940) as described. In block 1016, host runtime 902 starts writers executing in host system 702 to retrieve the trace data from database 940.

As discussed, kernel 760-1 also may provide host runtime 902 with a message indicating the success of any configuration operations performed, whether writing configuration data 920 and/or offload circuit architecture configuration data 1020.

Figure 11:
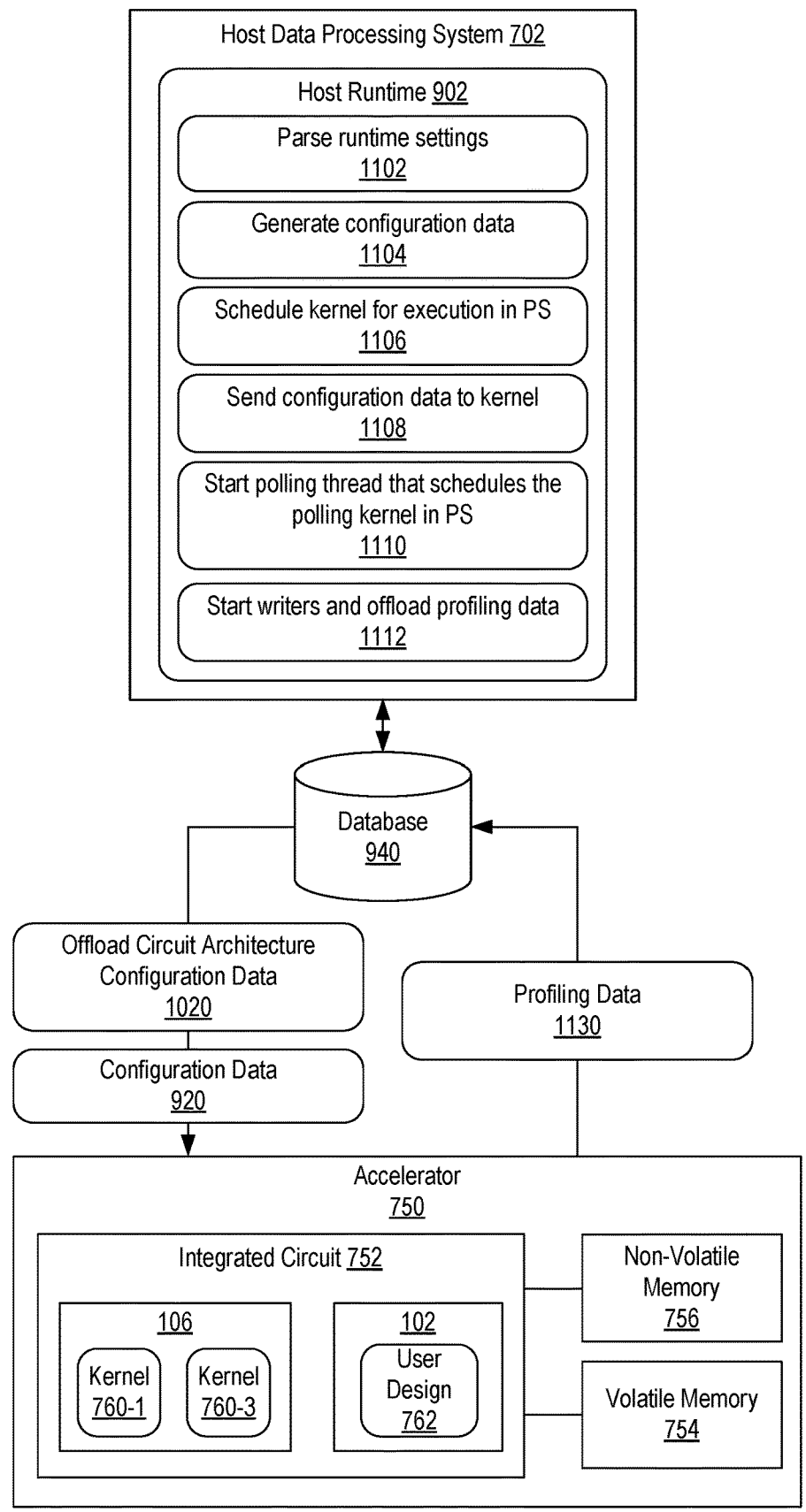
FIG. 11 illustrates another example implementation of the system of FIG. 7 for performing profiling.

FIG. 11 illustrates another example implementation of system 700 configured to perform profiling. Profiling refers to the sampling of values from certain counters of DP array 102. The data may be provided to host system 702 as sampled, e.g., in real-time. In the case of profiling, the offload circuit architecture is not required. That is, the PS 106, in executing the kernel(s) described, is capable of sampling data and returning the data to host system 702 without requiring the offload circuit architecture(s) described herein.

In the example of FIG. 11, host system 702 executes host runtime 902 substantially as described in the prior examples. In block 1102, host runtime 902 parses runtime settings. In this example, the runtime settings specify profiling operations to be performed. The profiling operations utilize the counters to track the occurrence of particular trace events. Each counter is configured to increment in response to the detection of a particular trace event or particular trace events. Thus, the trace configuration data 920 in the example of FIG. 11 configures particular counters (e.g., event logic 302, performance counter circuitry 304, and counter 308) to detect particular trace events to increment selected ones of counters 308 in response to particular trace event(s). Further, configuration data 920 specifies which active tiles of DP array 102 are to perform profiling. Profiling allows an analysis program executed by host system 702 to determine performance metrics of the user application such as bandwidth, percent stalling, and the like for a particular window or period of time.

In block 1104, host runtime 902 generates configuration data 920 that is used to configure the profiling functions of selected ones of the active tiles of DP array 102. In block 1106, host runtime 902 schedules kernel 760-1 for execution in PS 106. Kernel 760-1 may operate substantially as previously described. In block 1108, host runtime 902 sends configuration data 920 to kernel 760-1. Kernel 760-1, in response to receiving configuration data 920, configures trace functionality within DP array 102.

In block 1110, host runtime 902 starts a polling thread that schedules operation of kernel 760-3. Kernel 760-3 is configured to sample values of counters 308 that were configured by kernel 760-1 and do so at regularly scheduled intervals based on the polling thread started by host runtime 902. Accordingly, kernel 760-3 begins sampling counter values from the designated counters of DP array 102 during execution of the user's design 762 therein. In one or more examples, the sampling includes obtaining and/or determining other information that may be included with the sampled counter values. For example, the particular tile (e.g., row and/or column) from which a counter value was sampled may be included with, or accompany, the sampled counter value. In other examples, other data from DP array 102 may be determined and included with the sampled counter values for context.

Kernel 760-3 reports back sampled values (and/or any additional data), referred to as profiling data 1130, to host runtime 902 via database 940. For example, in response to each scheduled interval, kernel 760-3 reads counter values and sends the counter values to database 940. In block 1112, host runtime 902 starts writers executing in host system 702 to retrieve profiling data 1130 from database 940.

Host system 702 may execute profiling analysis software that is capable of generating a visualization of the profiling data 1130 that is received. For example, the profiling analysis application may generate a visualization such as a graph of the counters changing over time where each counter may be correlated with the particular event detected and particular tile in which that counter is located. Thus, the user may view the profiling information over time as the user's design executes or executed where that data is correlated to particular active tiles of DP array 102.

In one or more example implementations, kernel 760-1 may also provide host runtime 902 a message that indicates the success of the profiling configuration operation. For example, kernel 760-1 may write data indicating whether the profiling configuration performed was successful and/or any errors and/or warnings that may be occurred to a buffer. The buffer may be passed to host runtime 902 as a message indicating success of trace configuration of DP array 102.

In the various example implementations described herein, any trace data and/or profiling data that is offloaded from IC 752 may be analyzed using a data processing system executing suitable trace and/or profiling analysis software. A computer such as host system 702 or another computer system may be used. The data processing system is capable of analyzing the trace data as offloaded using the user-specified runtime settings and/or the metadata. The data processing system may execute trace analysis program code implementing the various analysis and trace report generation operations described herein. The data processing system may also store a trace packet format library specifying the formatting of the trace packets of the trace data so that the data processing system may parse, interpret, and/or analyze the trace data.

In one or more examples, the trace data may be in a compressed format. As part of the analysis, the data processing system is capable of decompressing the trace data. The raw (e.g., unprocessed) trace data may be in a hexadecimal format. The analysis provides context to the trace data. For example, context from the metadata and/or user-specified runtime settings may be used to contextualize the various trace events of the trace data.

For purposes of illustration and not limitation, the data processing system may correlate the occurrence of a trace event such as a stall or a counter value for a particular tile with the program code executing on that tile and with the particular function call and/or operation executing when the trace event (e.g., a stall in this example) occurred. In this example, the trace data may indicate the tile of the DP array in which a trace event occurred, the time of the occurrence, and the particular type of trace event that occurred. The data processing system cross-references the trace data with the metadata and/or user-specified runtime settings to add/determine contextual data such as the particular program code (e.g., kernel), function, and/or operation being performed at the time of the trace event. That is, the data processing system may determine that tile A executing function B of kernel C was performing operation D at the time of the detected trace event E. The operation may be the transfer of a particular buffer. The path of that buffer as conveyed through multiple tiles (e.g., stream interconnects and/or DMA circuits) may be traced via trace events generated by the various tiles in the path. The data processing system may also correlate trace events and/or profiling data with particular graphs (e.g., applications executing in different groups of tiles of DP array 102).

The data processing system is capable of generating one or more reports based on the analyzed trace and/or profiling data. The report(s) correlate the trace events with a particular operating context of the one or more selected tiles of the data processing array as specified by the metadata. For example, the report(s) can correlate trace events of the trace data with respective tiles of the one or more selected tiles (e.g., active tiles) of the DP array.

Figure 12A:
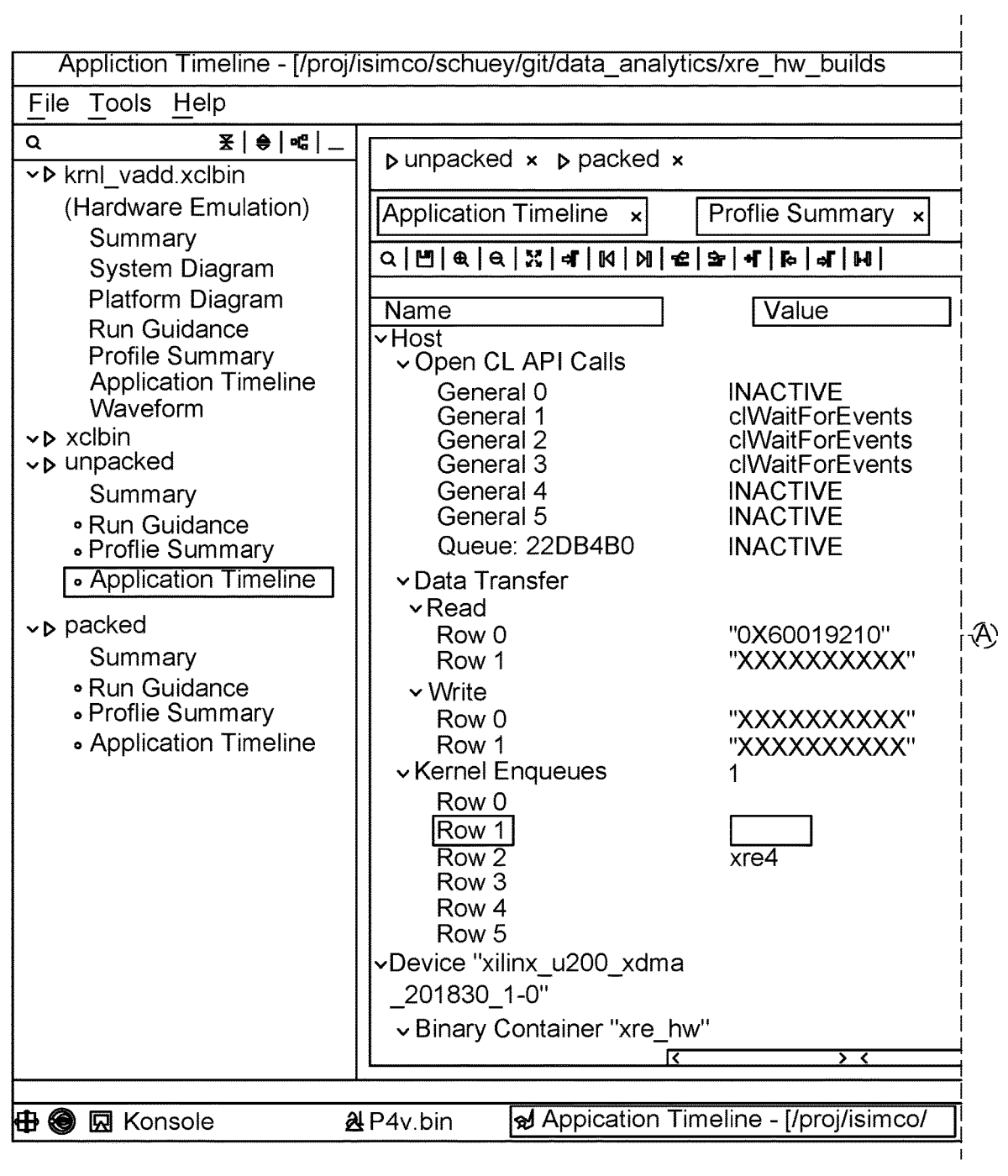
Figure 12B:
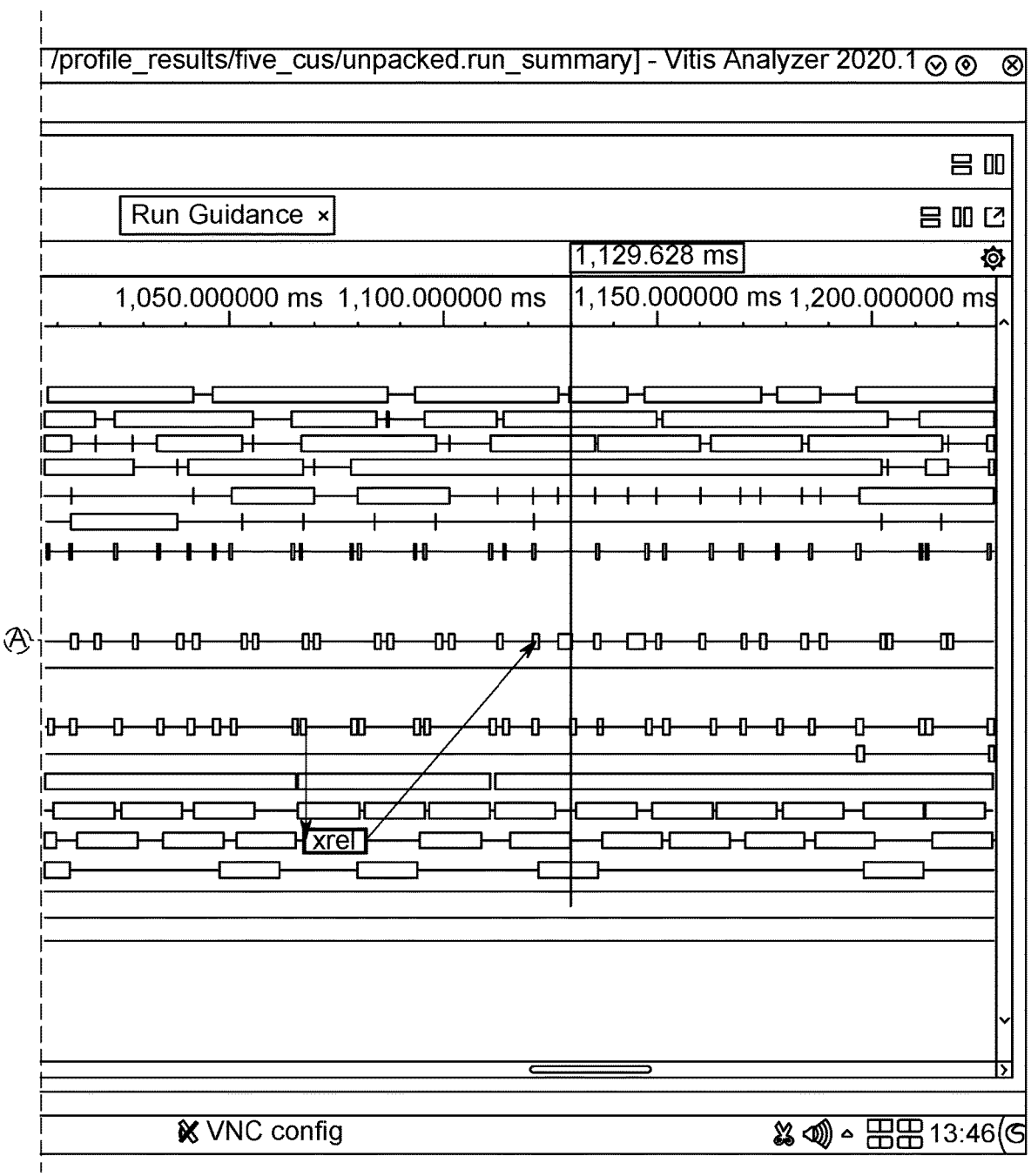

FIGS. 12A and 12B, taken collectively (and referred to as FIG. 12 herein), illustrate an example report that may be generated by the data processing system. In the example of FIG. 12, the report provides trace-based guidance that details operations occurring in the host (e.g., in PS 106). In the example of FIG. 12, the report detects and highlights dependencies between trace events where one trace event does not occur until after another trace event is done. Other operations potentially may occur therebetween. The time between the trace events (e.g., the amount of delay) indicates the need for a potential design modification or optimization.

Figure 13A:
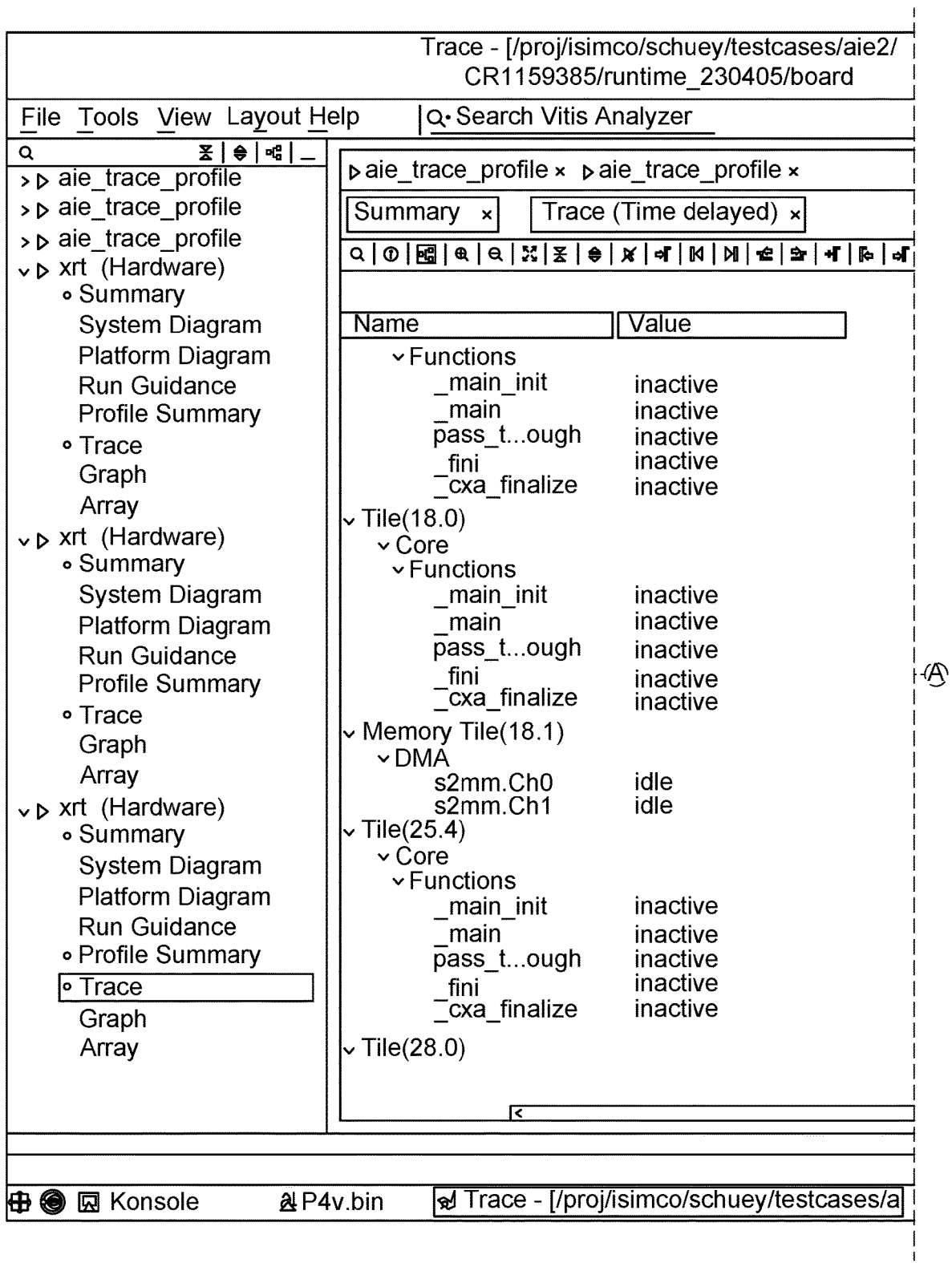
FIGS. 13A and 13B, taken collectively, illustrate another example report that may be generated by the data processing system.
Figure 13B:
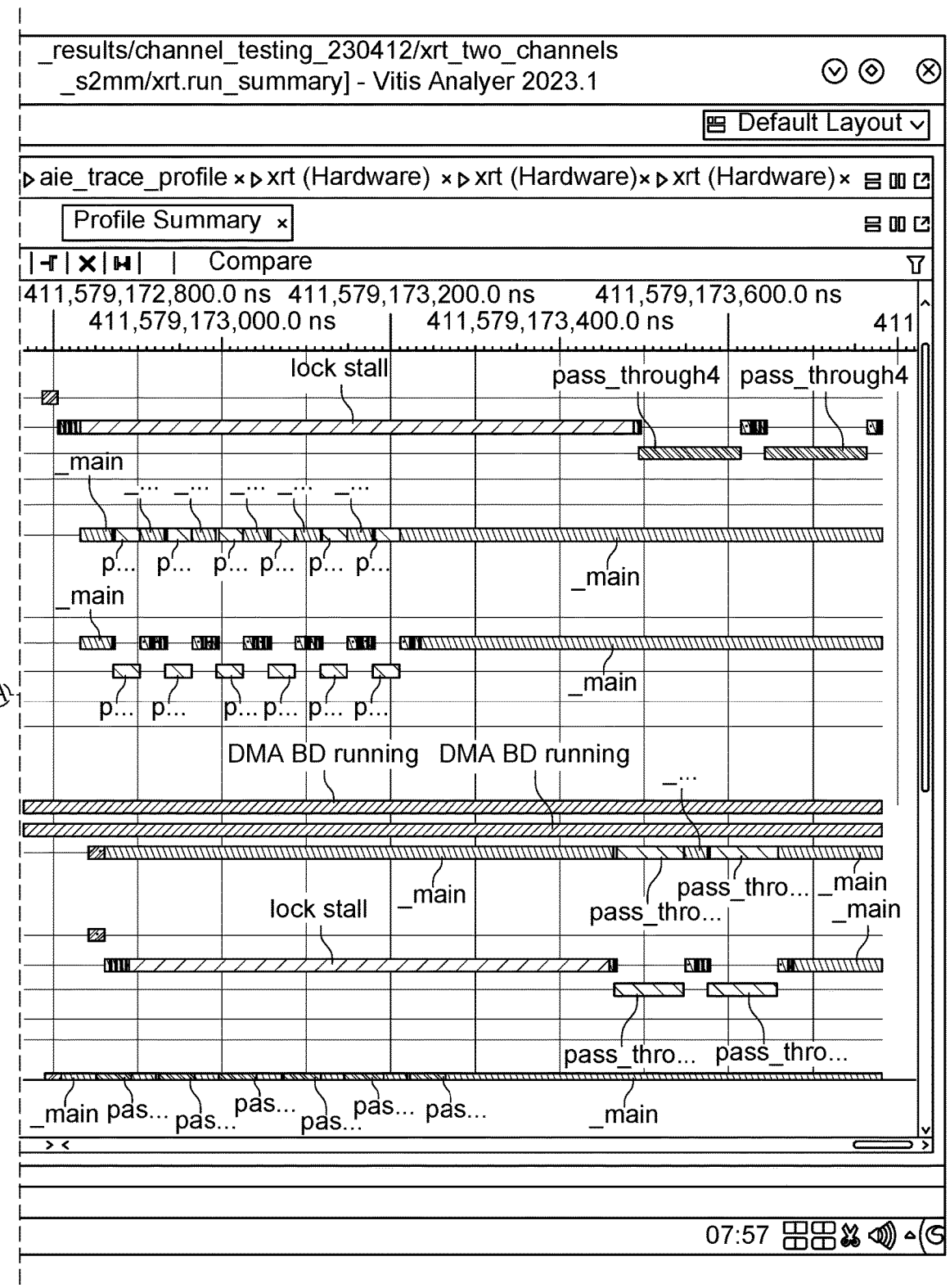

FIGS. 13A and 13B, taken collectively (and referred to as FIG. 13 herein), illustrate another example report that may be generated by the data processing system. In the example of FIG. 13, the report provides a visualization of activity occurring in the DP array in executing the user's design. The example of FIG. 13 illustrates trace vents for memory tiles of a DP array 102 in executing a user design.

In both FIGS. 12 and 13, the trace events (e.g., trace data) is illustrated as the blocks placed along the timeline in different rows while the particular meaning of the rows as specified by the information of the tree hierarchy on the left of each trace report is obtained from the metadata (e.g., tiles, graphs, kernels, functions, etc.). A similar report may be generated illustrating profiling data over time, where the different changing in the counter values are illustrated with reference to the particular tile in which the event occurred or was detected.

The terminology used herein is for the purpose of describing particular embodiments only and is not intended to be limiting. Notwithstanding, several definitions that apply throughout this document are expressly defined as follows.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, "data processing system" means one or more hardware systems configured to process data, each hardware system including at least one hardware processor programmed to initiate operations and memory.

As defined herein, "execute" and "run" comprise a series of actions or events performed by the hardware processor in accordance with one or more machine-readable instructions. "Running" and "executing," as defined herein refer to the active performing of actions or events by the hardware processor. The terms run, running, execute, and executing are used synonymously herein.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "individual" and "user" each refer to a human being.

As defined herein, the term "hardware processor" means at least one hardware circuit. The hardware circuit may be configured to carry out instructions contained in program code. The hardware circuit may be an integrated circuit. Examples of a hardware processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "real-time" means a level of processing responsiveness that a user or system senses as sufficiently immediate for a particular process or determination to be made, or that enables the processor to keep up with some external process.

As defined herein, the term "soft" in reference to a circuit means that the circuit is implemented in programmable logic or programmable circuitry. Thus, a "soft processor" means at least one circuit implemented in programmable circuitry that is capable of carrying out instructions embodied as program instructions.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the term "program code" is used interchangeably with the term "program instructions." Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    within an integrated circuit having a processor system and a data processing array, executing one or more kernels in the processor system in response to a scheduling request from a host data processing system;
    receiving, by the one or more kernels, configuration data for implementing profiling of a user design that is executable by a plurality of active tiles of the data processing array;
    configuring, using the one or more kernels, selected tiles of the plurality of active tiles of the data processing array with the configuration data to perform the profiling;
    generating profiling data through execution of the user design by the data processing array by sampling a plurality of counter values from the selected tiles of the data processing array during execution of the user design by the plurality of active tiles; and
    providing, from the one or more kernels, the profiling data including the plurality of counter values as sampled, to the host data processing system.

2. The method of claim 1, further comprising:
    the one or more kernels receiving, from the host data processing system, a buffer storing the configuration data.

3. The method of claim 1, further comprising:
    during execution of the user design by the data processing array, conveying trace data from the data processing array to a local memory using an offload circuit architecture.

4. The method of claim 3, wherein the trace data is stored in one or more buffers allocated by the one or more kernels in the local memory based on one or more addresses provided by the host data processing system.

5. The method of claim 3, wherein the offload circuit architecture is implemented using programmable logic.

6. The method of claim 3, wherein the offload circuit architecture is implemented using one or more direct memory access circuits.

7. The method of claim 6, further comprising:
receiving, by the processor system executing the one or more kernels, offload circuit architecture configuration data; and
configuring, by the processor system executing the one or more kernels, the offload circuit architecture for conveying a selected number of streams of trace data to the local memory.

8. The method of claim 7, wherein the offload circuit architecture configuration data further specifies at least one of the one or more direct memory access circuits, a number of ports of the one or more direct memory access circuits to be used, a burst length for the trace data, a buffer size for storing the trace data, or physical addresses of buffers for storing the trace data.

9. The method of claim 1, wherein the counter values specify a number of trace events detected in the selected tiles.

10. The method of claim 1, wherein the configuring comprises configuring performance counters in the selected tiles to perform trace and count selected trace events.

11. The method of claim 1, further comprising:
executing a polling kernel in the processor system, in response to a further scheduling request from the host data processing system, wherein the polling kernel performs the sampling and performs the providing the plurality of counter values as sampled to the host data processing system.

12. The method of claim 11, wherein the polling kernel is operative responsive to a polling thread executing in the host data processing system that causes the polling kernel to perform the sampling at a specified interval during execution of the user design.

13. A system, comprising:
an integrated circuit having a processor system and a data processing array;
wherein the data processing array includes a plurality of compute tiles and a plurality of memory tiles;
wherein each compute tile and each memory tile includes performance counter circuitry and counters in which the performance counter circuitry controls the counters;
wherein the processor system is configured to execute one or more kernels in response to a scheduling request from a host data processing system;
wherein processor system, in executing the one or more kernels, is configured to perform operations including:
receiving configuration data for implementing a trace function for a user design that is executable by a plurality of active tiles of the data processing array, wherein the plurality of active tiles include one or more of the plurality of compute tiles and one or more of the plurality of memory tiles;
configuring the data processing array to implement trace while executing the user design based on the configuration data;
wherein the trace is performed by counting selected events using the performance counter circuitry and the counters in the one or more of the plurality of compute tiles and the one or more of the plurality of memory tiles that are active; and
outputting trace data generated from execution of the user design by the data processing array.

14. The system of claim 13, wherein the integrated circuit comprises:
an offload circuit architecture configured to convey the trace data from the data processing array to a local memory during execution of the user design by the data processing array.

15. The system of claim 14, wherein the trace data is stored in one or more buffers allocated by the one or more kernels in the local memory based on one or more addresses provided by the host data processing system.

16. The system of claim 14, wherein the offload circuit architecture is implemented using programmable logic.

17. The system of claim 14, wherein the offload circuit architecture is implemented using one or more direct memory access circuits.

18. The system of claim 17, wherein the one or more kernels, as executed by the processor system, are configured to:
receive offload circuit architecture configuration data from the host data processing system; and
configure the offload circuit architecture for conveying a selected number of streams of trace data to the local memory.

19. A system, comprising:
an integrated circuit having a processor system and a data processing array:
wherein the processor system is configured to execute one or more kernels in response to a scheduling request from a host data processing system;
wherein processor system, in executing the one or more kernels, is configured to perform operations including:
receiving configuration data for implementing a profiling function for a user design that is executable by a plurality of active tiles of the data processing array;
configuring the data processing array to implement the profiling function while executing the user design based on the configuration data;
outputting profiling data generated from execution of the user design by the data processing array; and
execute a polling kernel that generates the profiling data by sampling counter values from selected tiles of the plurality of active tiles of the data processing array during execution of the user design.

20. The system of claim 19, wherein the polling kernel is operative responsive to a polling thread executing in the host data processing system that causes the polling kernel to perform the sampling at a specified interval during execution of the user design.

* * * * *